(12) United States Patent
Huang et al.

(10) Patent No.: US 11,356,619 B2
(45) Date of Patent: Jun. 7, 2022

(54) VIDEO SYNTHESIS METHOD, MODEL TRAINING METHOD, DEVICE, AND STORAGE MEDIUM

(71) Applicant: Tencent Technology (Shenzhen) Company Limited, Shenzhen (CN)

(72) Inventors: Haozhi Huang, Shenzhen (CN); Kun Cheng, Shenzhen (CN); Chun Yuan, Shenzhen (CN); Wei Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/239,438

(22) Filed: Apr. 23, 2021

(65) Prior Publication Data

US 2021/0243383 A1 Aug. 5, 2021

Related U.S. Application Data

(63) Continuation of application No. PCT/CN2020/076655, filed on Feb. 25, 2020.

(30) Foreign Application Priority Data

Mar. 6, 2019 (CN) .......................... 201910169985.3

(51) Int. Cl.
*G06T 13/00* (2011.01)
*H04N 5/265* (2006.01)
(Continued)

(52) U.S. Cl.
CPC ............. *H04N 5/265* (2013.01); *G06K 9/629* (2013.01); *G06K 9/6288* (2013.01); *G09G 5/377* (2013.01); *G09G 2340/10* (2013.01)

(58) Field of Classification Search
CPC . G06T 2207/20212; G06T 2207/20081; G06T 2207/20036; G06T 17/00;
(Continued)

(56) References Cited

U.S. PATENT DOCUMENTS 6,480,896 B1 11/2002 Brown et al.
8,467,570 B2 6/2013 Ma et al.
(Continued)

FOREIGN PATENT DOCUMENTS

CN 106709875 A 5/2017
CN 107194872 A 9/2017
(Continued)

OTHER PUBLICATIONS

Tencent Technology, WO, PCT/CN2020/076655, May 14, 2020, 6 pgs.

(Continued)

*Primary Examiner* — Hau H Nguyen
(74) *Attorney, Agent, or Firm* — Morgan, Lewis & Bockius LLP

(57) ABSTRACT

Embodiments of this application disclose methods, systems, and devices for video synthesis. In one aspect, a method comprises obtaining a plurality of frames corresponding to source image information of a first to-be-synthesized video, each frame of the source image information. The method also comprises obtaining a plurality of frames corresponding to target image information of a second to-be-synthesized video. For each frame of the plurality of frames corresponding to the target image information of the second to-be-synthesized video, the method comprises fusing a respective source image from the first to-be-synthesized video, a corresponding source motion key point, and a respective target motion key point corresponding to the frame using a pre-trained video synthesis model, and generating a respective (Continued)

output image in accordance with the fusing. The method further comprises repeating the fusing and the generating steps for the second to-be-synthesized video to produce a synthesized video.

20 Claims, 9 Drawing Sheets

(51) Int. Cl.
*G06K 9/62* (2022.01)
*G09G 5/377* (2006.01)

(58) Field of Classification Search
CPC ......... G06T 19/00; G06T 13/00; G06T 15/00;
G06T 3/0093; G06T 7/194; G06T 13/40;
G06F 3/011; H04N 2005/2726; H04N 5/272
See application file for complete search history.

(56) References Cited

U.S. PATENT DOCUMENTS

| 2008/0024503 | A1 | 1/2008 | Smith |
| 2010/0131078 | A1 | 5/2010 | Brown et al. |
| 2012/0327194 | A1* | 12/2012 | Shiratori ............... G06F 3/011 348/47 |
| 2013/0211586 | A1 | 8/2013 | Lee et al. |
| 2015/0149398 | A1 | 5/2015 | Hong et al. |
| 2015/0339846 | A1* | 11/2015 | Holzer ................ G06T 17/00 345/419 |
| 2019/0311202 | A1* | 10/2019 | Lee ................... G06K 9/627 |

FOREIGN PATENT DOCUMENTS

| CN | 108230431 A | 6/2018 |
| CN | 108510577 A | 9/2018 |
| CN | 108564119 A | 9/2018 |
| CN | 109951654 A | 6/2019 |

OTHER PUBLICATIONS

Tencent Technology, IPRP, PCT/CN2020/076655, Aug. 25, 2021, 7 pgs.
Anthropics Technology Limited, International Search Report in PCT/GB2001/005779, published under WO 2002/052508 A3 dated Jul. 4, 2002, 10 pgs.
Caroline Chan et al., "Everybody Dance Now", Article, U.C. Berkeley, vol. 1, No. 1, Aug. 27, 2019, 12 pgs.
Tencent Technology, ISR, PCT/CN2020/076655, May 14, 2020, 4 pgs.
Kenta Mizui et al., "Choreographing Amateur Performers Based on Motion Transfer Between Videos", International Conference on Multimedia Modeling, 2013, 20 pgs.

* cited by examiner

VIDEO SYNTHESIS METHOD, MODEL TRAINING METHOD, DEVICE, AND STORAGE MEDIUM

CROSS REFERENCE TO RELATED APPLICATIONS

This application is a continuation application of PCT Patent Application No. PCT/CN2020/076655, entitled "VIDEO SYNTHESIS METHOD, MODEL TRAINING METHOD, DEVICE AND STORAGE MEDIUM" filed on Feb. 25, 2020, which claims priority to Chinese Patent Application No. 201910169985.3, filed with the State Intellectual Property Office of the People's Republic of China on Mar. 6, 2019, and entitled "VIDEO SYNTHESIS METHOD, MODEL TRAINING METHOD, AND RELATED APPARATUS", all of which are incorporated herein by reference in their entirety.

FIELD OF THE TECHNOLOGY

This application relates to the field of artificial intelligence, and in particular, to a video synthesis method, a model training method, a device, and a storage medium.

BACKGROUND OF THE DISCLOSURE

As media forms diversify, a policy for transferring motion of characters in different videos has been provided. For two videos, a target character whose motion is intended to be synthesized is in one video, and a source character whose motion is transferred is in the other video. Motion is transferred between characters through a pixel-based end-to-end process. Video motion transfer enables an untrained amateur to perform dance movements such as spinning like a professional ballet dancer, or dance like a pop star.

According to a common processing manner of the current video motion transfer method, two videos are provided at first, one video including a transfer object, the other video including a motion reference sequence, then single-frame motion transfer is performed on each frame of motion in the video according to the motion reference sequence, and finally a new video is stitched together.

However, coherence of performing motion transfer on each frame according to the motion sequence is not good, resulting in poor continuity of a synthesized video in the time domain.

SUMMARY

According to embodiments of this application, a video synthesis method, a model training method, a device, and a storage medium are provided. A plurality of frames of source image information can be used to generate an output image corresponding to a motion sequence, and therefore information association between consecutive frames is fully taken into account, thereby enhancing continuity of a synthesized video in the time domain.

In one aspect of this application, a video synthesis method comprises:

obtaining a plurality of frames corresponding to source image information of a first to-be-synthesized video, each frame of the source image information including a source image that includes a transfer object and a source motion key point having a one-to-one correspondence with the source image;

obtaining a plurality of frames corresponding to target image information of a second to-be-synthesized video, the second to-be-synthesized video having a motion reference sequence for indicating an image order of video synthesis each frame of the target image information including a target motion key point;

for each frame of the plurality of frames corresponding to the target image information of the second to-be-synthesized video:

fusing a respective source image from the first to-be-synthesized video, the corresponding source motion key point, and a respective target motion key point corresponding to the frame using a pre-trained video synthesis model; and generating a respective output image in accordance with the fusing, the respective output image comprising the transfer object modified by the respective target motion key point and corresponding to respective frame of the plurality of frames of the source image information and the respective target motion key point; and repeating the fusing and the generating steps for the second to-be-synthesized video to produce a synthesized video according to the motion reference sequence.

According to another aspect of this application, a model training method comprises:

obtaining a to-be-trained video, the to-be-trained video including a plurality of frames of to-be-trained image information, each frame of to-be-trained image information including a target motion key point;

obtaining a predicted output image corresponding to the to-be-trained video by using a to-be-trained video synthesis model;

processing the predicted output image and a real output image by using a content loss function to obtain a first loss result and a second loss result;

processing the predicted output image and the real output image by using an adversarial loss function to obtain a third loss result and a fourth loss result; and training the to-be-trained video synthesis model according to the first loss result, the second loss result, the third loss result, and the fourth loss result, to obtain a video synthesis model, the video synthesis model being used for fusing a source image, a source motion key point, and a target motion key point, the source image and the source motion key point belonging to a first to-be-synthesized video, and the target motion key point belonging to a second to-be-synthesized video.

According to another aspect of this application, a video synthesis apparatus is provided, the apparatus comprising:

an obtaining module, configured to obtain K frames of source image information of a first to-be-synthesized video, each frame of source image information including a source image and a source motion key point, the source image and the source motion key point corresponding to each other, the source image including a transfer object, and K being an integer greater than 1;

the obtaining module being further configured to obtain a plurality of frames of target image information of a second to-be-synthesized video, each frame of target image information including a target motion key point, the second to-be-synthesized video corresponding to a motion reference sequence, the motion reference sequence being used for indicating an image order of video synthesis;

the obtaining module being further configured to obtain a first output image corresponding to the K frames of source image information and a first target motion key point by using a video synthesis model, the video synthesis model being used for fusing the source image, the source motion key point, and the target motion key point, the first output image including the transfer object, and the first target motion key point being a target motion key point in the plurality of frames of target image information; and a generation module, configured to generate a synthesized video according to the motion reference sequence obtained by the obtaining module and the first output image obtained by the obtaining module.

In some implementations, the obtaining module is specifically configured to perform feature extraction on the K frames of source image information and the first target motion key point by using the video synthesis model to obtain a foreground feature set and a background feature set, the foreground feature set including K foreground features, the background feature set including K background features;

obtain a foreground fusion feature corresponding to the foreground feature set by using the video synthesis model;

obtain a background fusion feature corresponding to the background feature set by using the video synthesis model;

perform convolution processing on the foreground fusion feature by using the video synthesis model to obtain a foreground image and a foreground mask, the foreground mask being used for extracting an image contour;

perform convolution processing on the background fusion feature by using the video synthesis model to obtain a background image; and process the foreground image, the foreground mask, and the background image by using the video synthesis model to obtain the first output image.

In some implementations, the obtaining module is specifically configured to determine K frames of foreground attention mask maps according to the foreground feature set, the source motion key point of the each frame of source image information in the K frames of source image information, and the first target motion key point; and determine the foreground fusion feature according to the K frames of foreground attention mask maps and the foreground feature set.

In some implementations, the obtaining module is specifically configured to calculate the foreground fusion feature in the following manner:

$$\tilde{F}_{f_g}^{t} = \Sigma_{k=1}^{K} F_{f_g}^{t_k} \odot A_{f_g}^{t_k},$$

$\tilde{F}_{f_g}^{t}$, representing the foreground fusion feature, $F_{f_g}^{t_k}$ representing a $k^{th}$ frame of foreground feature in the foreground feature set, $A_{f_g}^{t_k}$ representing a $k^{th}$ frame of foreground attention mask map in the K frames of foreground attention mask maps, and $\odot$ representing pixel multiplication.

In some implementations, the obtaining module is specifically configured to determine K frames of background attention mask maps according to the background feature set, the source motion key point of the each frame of source image information in the K frames of source image information, and the first target motion key point; and determine the background fusion feature according to the K frames of background attention mask maps and the background feature set.

In some implementations, the obtaining module is specifically configured to calculate the background fusion feature in the following manner:

$$\tilde{F}_{b_g}^{t} = \Sigma_{k=1}^{K} F_{b_g}^{t_k} \odot A_{b_g}^{t_k},$$

$\tilde{F}_{b_g}^{t}$ representing the background fusion feature, $F_{b_g}^{t_k}$ representing a $k^{th}$ frame of background feature in the background feature set, $A_{b_g}^{t_k}$ representing a $k^{th}$ frame of background attention mask map in the K frames of background attention mask maps, and $\odot$ representing pixel multiplication.

In some implementations, the obtaining module is specifically configured to calculate the first output image in the following manner:

$$O^t = O_{f_g}^{t} \odot M_{f_g}^{t} + O_{b_g}^{t} \odot (1 - M_{f_g}^{t}),$$

$O^t$ representing the first output image corresponding to a $t^{th}$ frame, $O_{f_g}^{t}$ representing the foreground image corresponding to the $t^{th}$ frame, $O_{b_g}^{t}$ representing the background image corresponding to the $t^{th}$ frame, $M_{f_g}^{t}$ representing the foreground mask corresponding to the $t^{th}$ frame, and $\odot$ representing pixel multiplication.

In some implementations, the obtaining module is further configured to obtain a second output image corresponding to the K frames of source image information and a second target motion key point by using the video synthesis model before the generation module generates a synthesized video according to the motion reference sequence and the first output image, the second output image including the transfer object, and the second target motion key point being a target motion key point in the plurality of frames of target image information; and the generation module is specifically configured to process the first output image and the second output image according to the motion reference sequence to obtain the synthesized video.

According to another aspect of this application, a model training apparatus is provided, comprising:

an obtaining module, configured to obtain a to-be-trained video, the to-be-trained video including a plurality of frames of to-be-trained image information, each frame of to-be-trained image information including a target motion key point;

the obtaining module being further configured to obtain a predicted output image corresponding to the to-be-trained video by using a to-be-trained video synthesis model;

a processing module, configured to process the predicted output image obtained by the obtaining module and a real output image by using a content loss function to obtain a first loss result and a second loss result;

the processing module being further configured to process the predicted output image obtained by the obtaining module and the real output image by using an adversarial loss function to obtain a third loss result and a fourth loss result; and a training module, configured to train the to-be-trained video synthesis model according to the first loss result, the second loss result, the third loss result, and the fourth loss result obtained through processing of the processing module, to obtain a video synthesis model, the video synthesis model being used for fusing a source image, a source motion key point, and a target motion key point, the source image and the source motion key point belonging to a first to-be-synthesized video, and the target motion key point belonging to a second to-be-synthesized video.

In some implementations, the processing module is specifically configured to perform feature extraction on the predicted output image to obtain a predicted image feature, and perform feature extraction on the real output image to obtain a real image feature;

calculate the predicted output image and the real output image by using a mean square error loss function to obtain the first loss result;

calculate the predicted image feature and the real image feature by using a VGG loss function to obtain the second loss result;

calculate the predicted output image, the real output image, and the target motion key point by using a single-frame adversarial loss function and an image reality discriminator to obtain the third loss result; and calculate a predicted output video and a real output video by using a time-domain adversarial loss function and a video reality discriminator to obtain the fourth loss result, the predicted output video including a plurality of frames of predicted output images, and the real output video including a plurality of frames of real output images.

In some implementations, the processing module is specifically configured to calculate the first loss result in the following manner:

$$L_{MSE}=\Sigma_t\|O^t-I_T^t\|_2^2,$$

$L_{MSE}$ representing the first loss result, $O^t$ representing the predicted output image, $I_T^t$ representing the real output image, and t representing a frame number of an image;

calculate the second loss result in the following manner:

$$L_{VGG}=\Sigma_t\|\phi(O^t)-\phi(I_T^t)\|_2,$$

$L_{VGG}$ representing the second loss result, $\phi(O^t)$ representing the predicted image feature, and $\phi(I_T^t)$ representing the real image feature;

calculate the third loss result in the following manner:

$$L_{GAN,I}=\Sigma_t\|D_I(I_T^t,p_T^t)\|_2^2+\|1-D_I(O^t,p_T^t)\|_2^2,$$

$L_{GAN,I}$ representing the third loss result, $D_I$ representing the image reality discriminator, and $p_T^t$ representing the target motion key point; and calculate the fourth loss result in the following manner:

$$L_{GAN,V}=\Sigma_n\Sigma_t\|D_V^n(V_T^{[t-n+1,t]},W_T^{[t-n+2,t]})\|_2^2+\|1-D_V^n(V_O^{[t-n+1,t]},W_T^{[t-n+2,t]})\|_2^2,$$

$L_{GAN,V}$ representing the fourth loss result, $D_V^n$ representing the video reality discriminator, $V_T^{[t-n+1,t]}$ representing the predicted output video, $V_O^{[t-n+1,t]}$ representing the real output video, $W_T^{[t-n+2,t]}$ representing optical flow information, and n representing a number of image frames used by the video reality discriminator.

In some implementations, the training module is specifically configured to calculate a total loss result according to the first loss result, the second loss result, the third loss result, and the fourth loss result;

determine a model parameter according to the total loss result;

train the to-be-trained video synthesis model according to the model parameter to obtain the video synthesis model;

calculate the total loss result in the following manner:

$$L_{total}=L_{MSE}+\lambda_{VGG}+L_{VGG}+\lambda_{GI}L_{GAN,I}+\lambda_{GV}L_{GAN,V},$$

$L_{total}$ representing the total loss result, $L_{MSE}$ representing the first loss result, $\lambda_{VGG}$ representing a first weight coefficient, $L_{VGG}$ representing the second loss result, and $\lambda_{GI}$ representing a second weight coefficient, $L_{GAN,I}$ representing the third loss result, $\lambda_{GV}$ representing a third weight coefficient, and $L_{GAN,V}$ representing the fourth loss result; and calculate the model parameter in the following manner:

$$\underset{G}{\operatorname{argmin}}\max_{D_I,D_V}(G,D_I,D_V); \text{ and}$$

-continued $$\underset{G}{\operatorname{argmin}}\max_{D_I,D_V}()$$

representing a variable value in a case that a function takes a maximum or minimum, G representing the model parameter, $D_I$ representing the image reality discriminator, and $D_V$ representing the video reality discriminator.

According to another aspect of this application, a terminal device is provided, including: a memory, a transceiver, a processor, and a bus system, the memory being configured to store a program, and the processor being configured to execute the program in the memory, including the following operations:

obtaining K frames of source image information of a first to-be-synthesized video, each frame of source image information including a source image and a source motion key point, the source image and the source motion key point corresponding to each other, the source image including a transfer object, and K being an integer greater than 1;

obtaining a plurality of frames of target image information of a second to-be-synthesized video, each frame of target image information including a target motion key point, the second to-be-synthesized video corresponding to a motion reference sequence, the motion reference sequence being used for indicating an image order of video synthesis;

obtaining a first output image corresponding to the K frames of source image information and a first target motion key point by using a video synthesis model, the video synthesis model being used for fusing the source image, the source motion key point, and the target motion key point, the first output image including the transfer object, and the first target motion key point being a target motion key point in the plurality of frames of target image information; and generating a synthesized video according to the motion reference sequence and the first output image; and the bus system being configured to connect the memory and the processor to enable communication between the memory and the processor.

According to another aspect of this application, a server is provided, including: a memory, a transceiver, a processor, and a bus system, the memory being configured to store a program, and the processor being configured to execute the program in the memory, including the following operations:

obtaining a to-be-trained video, the to-be-trained video including a plurality of frames of to-be-trained image information, each frame of to-be-trained image information including a target motion key point;

obtaining a predicted output image corresponding to the to-be-trained video by using a to-be-trained video synthesis model;

processing the predicted output image and a real output image by using a content loss function to obtain a first loss result and a second loss result;

processing the predicted output image and the real output image by using an adversarial loss function to obtain a third loss result and a fourth loss result; and training the to-be-trained video synthesis model according to the first loss result, the second loss result, the third loss result, and the fourth loss result, to obtain a video synthesis model, the video synthesis model being used for fusing a source image, a source motion key point, and a target motion key point, the source image and the source motion key point belonging to a first to-be-synthesized video, and the target motion key point belonging to a second to-be-synthesized video; and the bus system being configured to connect the memory and the processor to enable communication between the memory and the processor.

According to another aspect of this application, a computing device comprises one or more processors and memory. The memory stores one or more programs comprising instructions that, when executed by the one or more processors, cause the one or more processors to perform an of the methods described herein.

According to another aspect of this application, a non-transitory computer-readable storage medium is provided. The computer-readable storage medium stores instructions, and the instructions, when running on a computer (e.g., a computing device), cause the computer to perform any of the methods disclosed herein.

According to the foregoing technical solutions, the embodiments of this application have the following advantages:

According to the embodiments of this application, a video synthesis method is provided. K (e.g., where K is a positive integer larger than one) frames of source image information of a first to-be-synthesized video are first obtained, each frame of source image information including a source image and a source motion key point, the source image including a transfer object; a plurality of frames of target image information of a second to-be-synthesized video is obtained, each frame of target image information including a target motion key point, the second to-be-synthesized video corresponding to a motion reference sequence, the motion reference sequence being used for indicating an image order of video synthesis; then, a first output image corresponding to the K frames of source image information and a first target motion key point is obtained by using a video synthesis model, the video synthesis model being used for fusing the source image, the source motion key point, and the target motion key point, the first output image including the transfer object, and the first target motion key point being a target motion key point in the plurality of frames of target image information; and finally a synthesized video is generated according to the motion reference sequence and the first output image. According to the foregoing method, a plurality of frames of source image information can be used to generate an output image corresponding to a motion sequence, and therefore information association between consecutive frames is fully taken into account, thereby enhancing continuity of a synthesized video in the time domain.

BRIEF DESCRIPTION OF THE DRAWINGS

To describe the technical solutions in embodiments of this application more clearly, the following briefly describes the accompanying drawings required for describing the embodiments. Apparently, the accompanying drawings in the following descriptions show only some embodiments of this application, and a person of ordinary skill in the art may still derive other accompanying drawings from the accompanying drawings without creative efforts.

DESCRIPTION OF EMBODIMENTS

According to embodiments of this application, a video synthesis method, a model training method, and a related apparatus are provided. A plurality of frames of source image information can be used to generate an output image corresponding to a motion sequence, and therefore information association between consecutive frames is fully taken into account, thereby enhancing continuity of a synthesized video in the time domain.

The terms "first", "second", "third", "fourth", and the like (if any) in the specification and the claims of this application and the foregoing accompanying drawings are used for distinguishing similar objects, and are not necessarily used for describing a particular sequence or order. It may be understood that the data termed in such a way is interchangeable in proper circumstances, so that the embodiments of this application described herein for example, can be implemented in other orders than the order illustrated or described herein. In addition, the terms "include", "corresponding to" and any other variants are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device.

It is to be understood that this application provides a video motion transfer method based on multi-frame fusion. For two given videos, one video including a transfer object, and the other video including a motion reference sequence, motion of the motion reference sequence can be transferred to the transfer object without changing identity information or external representation of the transfer object. This application is specifically applicable to a plurality of scenarios, including but not limited to video editing and production, and low-cost computer animation (CA) motion capture, where a pending motion sequence can be quickly applied to a target character and a scenario, and the appearance of a main body is well maintained. For example, a source video of dancing of a person is given. Performance of standard motion can be transferred to a target character of a service after the person has performed the standard motion for a few minutes. One video is a video of the performance of an ideal dancer in a user's mind, the other video is a video in which motion is provided by the user casually, and a final target video is obtained by a synthesis of the two videos, so that the user can dance in graceful postures that the user dreams about.

Figure 1:
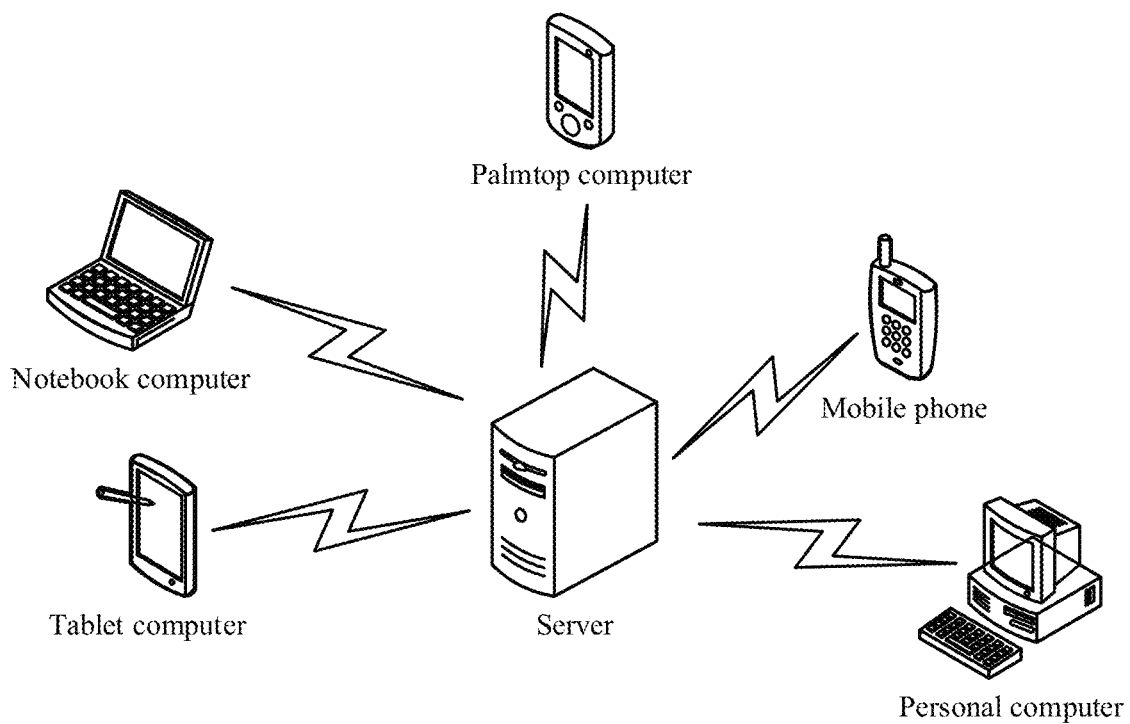
FIG. 1 is a schematic architectural diagram of a video synthesis system according to an embodiment of this application.

For ease of understanding, this application provides a video synthesis method, applicable to a video synthesis system shown in FIG. 1. Referring to FIG. 1, FIG. 1 is a schematic architectural diagram of a video synthesis system according to an embodiment of this application. As shown in the figure, this application designs a video synthesis model based on a convolutional neural network. The video synthesis model is applicable to a client or a server. If the video synthesis model is applied to a client, video synthesis can be performed offline. If the video synthesis model is applied to a server, video synthesis can be performed by the server online, and a finally synthesized video is sent to a client for playing and sharing.

In a possible implementation, first, each picture is sent to a feature extraction network of the video synthesis model, so that a foreground and a background are separated and corresponding feature maps are extracted. Then by using a feature aggregation module in the video synthesis model, the two feature maps each aggregate a plurality of frames of valid information to better restore details of the foreground and the background. Subsequently, respective decoders decode two aggregated features separately to generate corresponding foreground images, foreground masks, and background images. Finally, an output image is synthesized by using an aggregation module.

The client is deployed on a terminal device. The terminal device includes, but is not limited to, a tablet computer, a notebook computer, a palmtop computer, a mobile phone, and a personal computer (PC), and is not limited herein.

Figure 2:
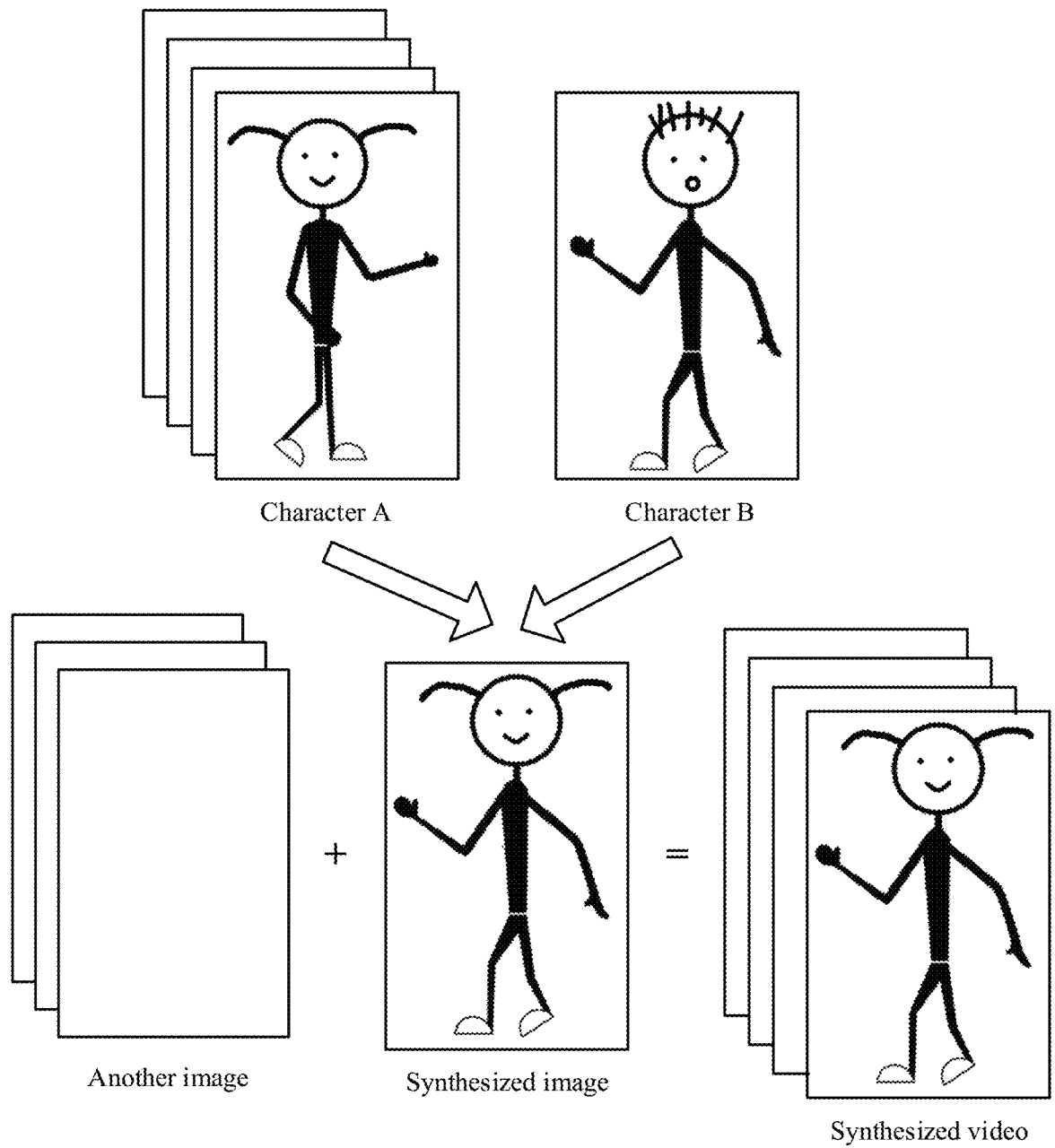
FIG. 2 is a schematic effect diagram of a synthesized video according to an embodiment of this application.

The video synthesis method provided in this application is described below with reference to FIG. 2. Referring to FIG. 2, FIG. 2 is a schematic effect diagram of a synthesized video according to an embodiment of this application. As shown in the figure, a source video is given. In the source video, it can be seen that a character A is dancing, and meanwhile another target video is given. In the target video, it can be seen that a character B is dancing. An $t^{th}$ frame of video of the target video is fused with the source video to obtain a synthesized image. In the synthesized image, it can be seen that the character A is performing a dance of the character B. The synthesized image is combined with other images that have been synthesized in advance to generate a synthesized video. The synthesized video can be played and analyzed on the client.

Figure 3:
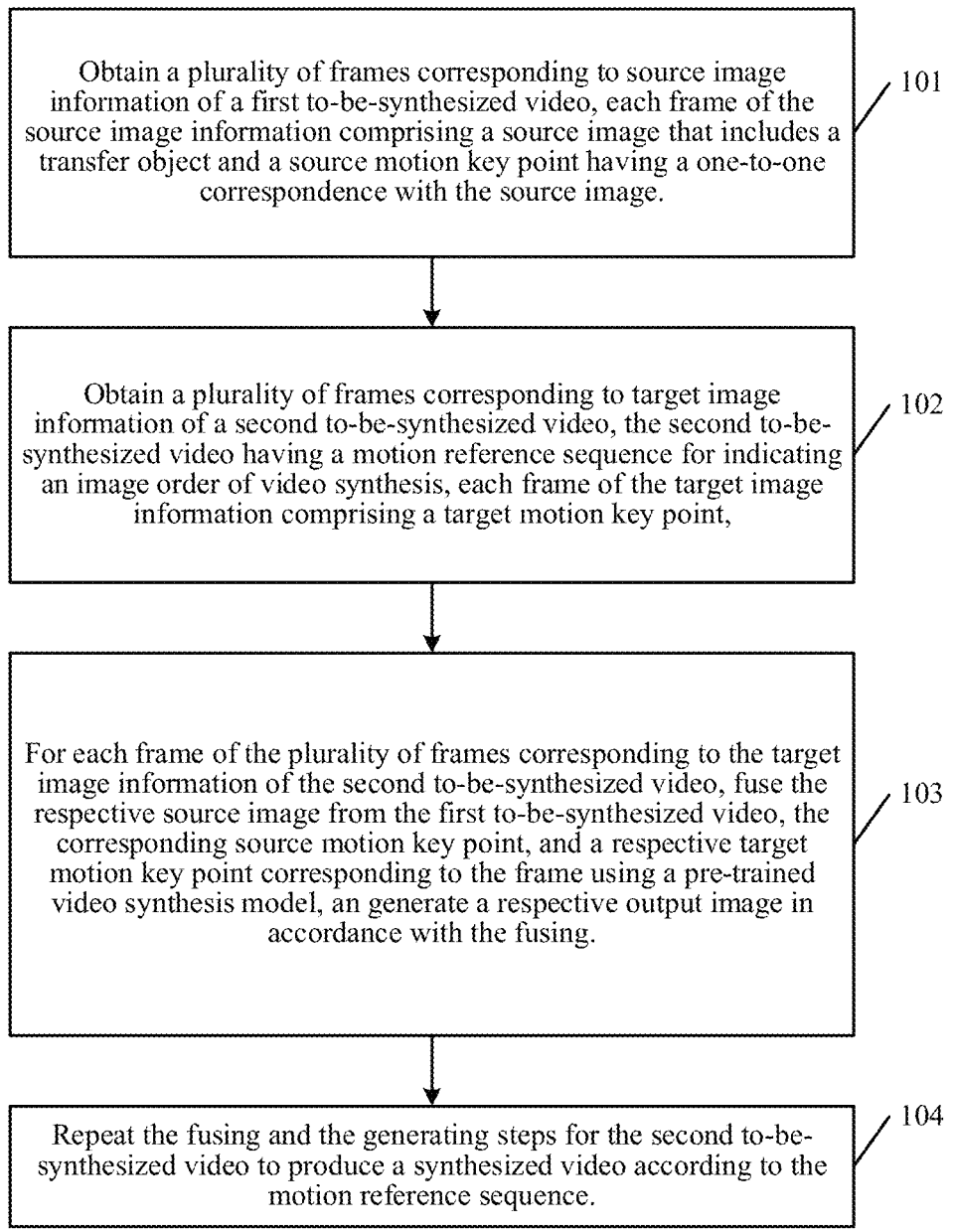
FIG. 3 is a schematic diagram of an embodiment of a video synthesis method according to an embodiment of this application.

The video synthesis method in this application is introduced below with reference to the foregoing introduction. Referring to FIG. 3, an embodiment of the video synthesis method in the embodiments of this application includes the following steps:

101: A video synthesis apparatus obtains a plurality of frames (e.g., K frames, where K is an integer greater than one) corresponding to source image information of a first to-be-synthesized video, each frame of the source image information comprising a source image that includes a transfer object and a source motion key point having a one-to-one correspondence with the source image.

In this embodiment, the video synthesis apparatus obtains the first to-be-synthesized video. It can be understood that the video synthesis apparatus can be deployed on a server or a terminal device, which is not limited herein. After the first to-be-synthesized video is obtained, information extraction needs to be performed on K frames of images in the first to-be-synthesized video to obtain the K frames of source image information, and K is an integer greater than 1. In the K frames of source image information, each frame of source image information includes a source image and a source motion key point. The source image is a frame of image in the first to-be-synthesized video, and the source image includes a transfer object. Normally, the transfer object may be a person, an animal, or another movable object, that is, the source image may include a complete person, animal, or another movable object. For example, the source image may be a full-body image of a person. The transfer object may be an object specified in the source image. For example, the transfer object may be marked in the source image, or may be an object identified by the video synthesis apparatus, which is not limited herein. The source motion key point is a motion key point of a transfer object in a source image, such as a head key point, an elbow key point, a neck key point, a knee key point, or a shoulder key point of a person.

The video synthesis apparatus may alternatively obtain a plurality of images, and perform, by using each image as the foregoing source image, a step of obtaining the source image information based on the plurality of images. In the embodiments of this application, all the plurality of images include the same object, that is, each image includes an object with the same identity information and external representation, and the object is the foregoing transfer object. In an embodiment of this application, only obtaining the first to-be-synthesized video by the video synthesis apparatus is taken as an example for description.

102: The video synthesis apparatus obtains a plurality of frames corresponding to target image information of a second to-be-synthesized video, the second to-be-synthesized video having a motion reference sequence for indicating an image order of video synthesis, each frame of the target image information comprising a target motion key point.

In this embodiment, the video synthesis apparatus obtains the second to-be-synthesized video. After the second to-be-synthesized video is obtained, information extraction needs to be performed on images in the second to-be-synthesized video to obtain a plurality of frames of target image information, where each frame of target image information includes a target motion key point corresponding to a transferred object. Normally, the transferred object may be a person, an animal, or another movable object. The target motion key point is a motion key point of a transferred object, such as a head key point, an elbow key point, a neck key point, a knee key point, or a shoulder key point of a person.

The second to-be-synthesized video corresponds to the motion reference sequence, and the motion reference sequence is used for indicating an image order of video synthesis. For example, the second to-be-synthesized video includes 5 frames of images, and corresponding motion reference sequences are sequence 1, sequence 2, and sequence 3, sequence 4, and sequence 5. A synthesized video generated in the order of sequences 1 to 5 also includes 5 frames of images, where image 1 and sequence 1 correspond to each other, image 2 and sequence 2 correspond to each other, image 3 and sequence 3 correspond to each other, image 4 and sequence 4 correspond to each other, and image 5 and sequence 5 correspond to each other.

103: For each frame of the plurality of frames corresponding to the target image information of the second to-besynthesized video, the video synthesis apparatus fuses a respective source image from the first to-be-synthesized video, the corresponding source motion key point, and a respective target motion key point corresponding to the frame using a pre-trained video synthesis model. The video synthesis apparatus generates a respective output image in accordance with the fusing. The respective output image comprises the transfer object modified by the respective target motion key point and corresponds to a respective frame of the plurality of frames of the source image information and the respective target motion key point.

In this embodiment, the video synthesis apparatus inputs the K frames of source image information and the first target motion key point in the plurality of frames of target image information to the video synthesis model, and the video synthesis model outputs the corresponding first output image. The video synthesis model herein is a model trained in advance (e.g., a pre-trained model), which can fuse the source image, the source motion key point, and the target motion key point. The finally generated first output image includes the transfer object. Therefore, the first output image has the same identity information as that of the first to-be-synthesized video, and the appearance of the transfer object is maintained.

104: The video synthesis apparatus repeats the fusing and generating steps for the second to-be-synthesized video to produce a synthesized video according to the motion reference sequence.

In this embodiment, the video synthesis apparatus stitches the first output image and other output images according to the motion reference sequence corresponding to the second to-be-synthesized video to obtain the synthesized video. It is understandable that if the video synthesis apparatus is deployed on the terminal device, the synthesized video can be displayed after the synthesized video is obtained. If the video synthesis apparatus is deployed on the server, the synthesized video needs to be sent to the terminal device after the synthesized video is obtained, and the terminal device displays the synthesized video.

According to the embodiments of this application, a video synthesis method is provided. K frames of source image information of a first to-be-synthesized video are first obtained, each frame of source image information including a source image and a source motion key point, the source image including a transfer object; a plurality of frames of target image information of a second to-be-synthesized video is obtained, each frame of target image information including a target motion key point, the second to-be-synthesized video corresponding to a motion reference sequence, the motion reference sequence being used for indicating an image order of video synthesis; then, a first output image corresponding to the K frames of source image information and a first target motion key point is obtained by using a video synthesis model, the video synthesis model being used for fusing the source image, the source motion key point, and the target motion key point, the first output image including the transfer object, and the first target motion key point being a target motion key point in the plurality of frames of target image information; and finally a synthesized video is generated according to the motion reference sequence and the first output image. According to the foregoing method, a plurality of frames of source image information can be used to generate an output image corresponding to a motion sequence, and therefore information association between consecutive frames is fully taken into account, thereby enhancing continuity of a synthesized video in the time domain. In a possible implementation, the video synthesis apparatus may alternatively directly perform video synthesis based on an arrangement order of video frames in the second to-be-synthesized video, that is, one video frame in the second to-be-synthesized video corresponds to a set of target motion key points, and an output image is generated based on the K frames of source image information and the set of target motion key points. An arrangement order of the output image in the synthesized video is the same as the arrangement order of the video frame corresponding to the set of target motion key points in the second to-be-synthesized video.

Based on the embodiment corresponding to FIG. 3, in some embodiments, the obtaining, by the video synthesis apparatus, a first output image corresponding to the K frames of source image information and a first target motion key point by using a video synthesis model includes:

performing, by the video synthesis apparatus, feature extraction on the K frames of source image information and the first target motion key point by using the video synthesis model to obtain a foreground feature set and a background feature set, the foreground feature set including K foreground features, the background feature set including K background features;

obtaining, by the video synthesis apparatus, a foreground fusion feature corresponding to the foreground feature set by using the video synthesis model;

obtaining, by the video synthesis apparatus, a background fusion feature corresponding to the background feature set by using the video synthesis model;

performing, by the video synthesis apparatus, convolution processing on the foreground fusion feature by using the video synthesis model to obtain a foreground image and a foreground mask, the foreground mask being used for extracting an image contour;

performing, by the video synthesis apparatus, convolution processing on the background fusion feature by using the video synthesis model to obtain a background image; and processing, by the video synthesis apparatus, the foreground image, the foreground mask, and the background image by using the video synthesis model to obtain the first output image.

In this embodiment, a process of processing two to-be-synthesized videos by using a video synthesis model is introduced. First, a video synthesis apparatus inputs K frames of source image information and a first target motion key point to the video synthesis model; then the video synthesis model performs feature extraction on the K frames of source image information and the first target motion key point to obtain a foreground feature set and a background feature set, the foreground feature set including K foreground features, the background feature set including K background features, that is, each foreground feature corresponding to a piece of source image information, and each background feature corresponding to a piece of source image information; next the foreground feature set and the background feature set are separately fused to obtain a foreground fusion feature and a background fusion feature; convolution processing is performed separately on the foreground fusion feature and the background fusion feature to obtain a foreground image, a foreground mask, and a background image, where the foreground image is closer to a user's point of view, the background image includes people and scenery that are located deep in a screen and farther away from the user's point of view, and the foreground mask is designed to remove aliasing during synthesis and can be used to extract an image contour; and finally, the foreground image, the foreground mask, and the background image are synthesized to obtain the first output image.

Figure 4:
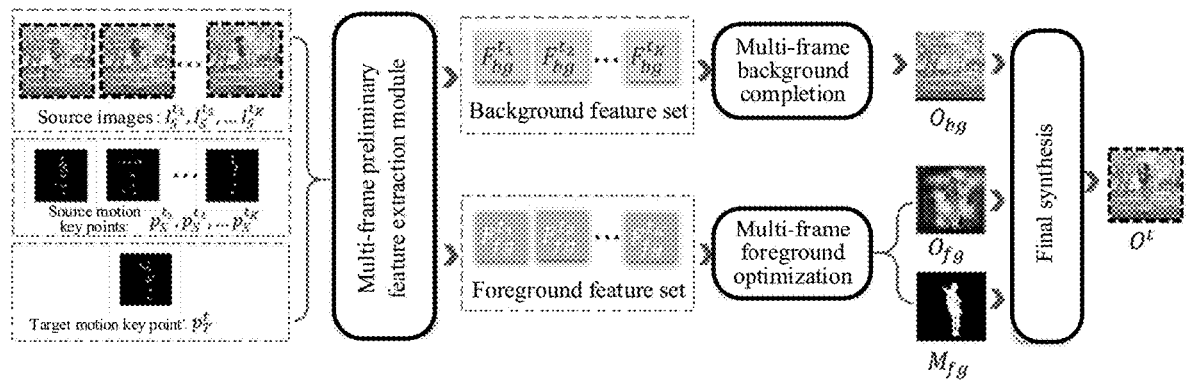
FIG. 4 is a schematic flowchart of a framework of a video synthesis system according to an embodiment of this application.

In a possible implementation, referring to FIG. 4, FIG. 4 is a schematic flowchart of a framework of a video synthesis system according to an embodiment of this application. As shown in the figure, the K frames of source image information includes K frames of source images ($I_S^{t1}, I_S^{t2}, \ldots I_S^{tK}$), the K frames of source motion key points ($p_S^{t1}, p_S^{t2}, \ldots p_S^{tK}$), and a target motion key point ($p_T^t$). The K frames of source images ($I_S^{t1}, I_S^{t2}, \ldots I_S^{tK}$), the K frames of source motion key points ($p_S^{t1}, p_S^{t2}, \ldots p_S^{tK}$), and the target motion key points ($p_T^t$) are inputted to a multi-frame preliminary feature extraction module, thereby extracting a foreground feature set ($F_{f_g}^{t1}, F_{f_g}^{t2}, \ldots F_{f_g}^{tK}$) and a background feature set ($F_{b_g}^{t1}, F_{b_g}^{t2}, \ldots F_{b_g}^{tK}$). Next, feature fusion is performed on the foreground feature set ($F_{f_g}^{t1}, F_{f_g}^{t2}, \ldots F_{f_g}^{tK}$). For example, the video synthesis system may include a feature aggregation module, features in the foreground feature set can be fused by using the feature aggregation module, and convolution processing can be performed on the fused foreground feature set to obtain a foreground image $O_{f_g}$ and a foreground mask $M_{f_g}$. Feature fusion is performed on the background feature set ($F_{b_g}^{t1}, F_{b_g}^{t2}, \ldots F_{b_g}^{tK}$). For example, features in the background feature set can be fused by using the feature aggregation module, and convolution processing can be performed on the fused background feature set to obtain a background image $O_{b_g}$. Finally, the foreground image $O_{f_g}$, the foreground mask $M_{f_g}$, and the background image $O_{b_g}$ are processed by using the video synthesis model to obtain an output image $O^t$.

Figure 5:
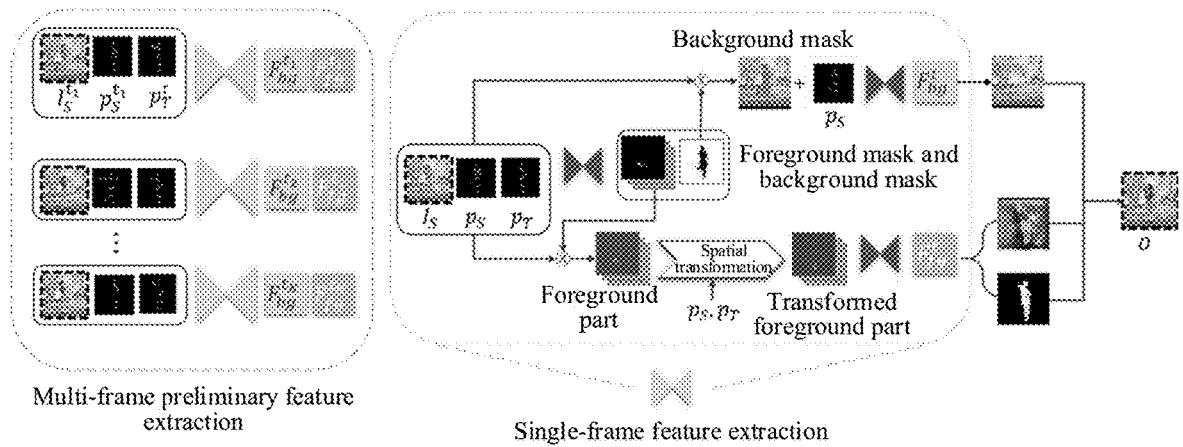
FIG. 5 is a schematic structural diagram of a feature extractor according to an embodiment of this application.

FIG. 5 is a schematic structural diagram of a feature extractor according to an embodiment of this application. As shown in FIG. 5, some embodiments of this application adopt a feature extractor based on a convolutional neural network to perform feature extraction. The feature extractor is composed of a first half of a single-frame posture transfer network. A plurality of frames of input images share the same feature extractor, and are respectively encoded into m-channel feature maps, where m can take a value of 64, 128, or the like, which is not limited herein. In a process of multi-frame preliminary feature extraction, each frame of source image information in the first to-be-synthesized video is processed to obtain a foreground feature set ($F_{f_g}^{t1}, F_{f_g}^{t2}, \ldots F_{f_g}^{tK}$) and a background feature set ($F_{b_g}^{t1}, F_{b_g}^{t2}, \ldots F_{b_g}^{tK}$). In the process of single-frame feature extraction, the foreground part is spatially transformed to obtain a transformed foreground part so as to obtain the foreground features. The background mask is processed to obtain the background features. Finally, feature fusion and convolution processing are performed on the foreground features to obtain the foreground image and the foreground mask. Feature fusion and convolution processing are performed on the background features to obtain the background image. The foreground image, the foreground mask, and the background image are processed by using the video synthesis model to obtain the output image.

Next, in the embodiments of this application, an output image generation method is provided. First, feature extraction is performed on K frames of source image information and a target motion key point by using a video synthesis model to obtain a foreground feature set and a background feature set; then, a foreground fusion feature corresponding to the foreground feature set is obtained by using the video synthesis model; a background fusion feature corresponding to the background feature set is obtained by using the video synthesis model; next, convolution processing is performed on the foreground fusion feature by using the video synthesis model to obtain a foreground image and a foreground mask; convolution processing is performed on the background fusion feature by using the video synthesis model to obtain a background image; and finally, the foreground image, the foreground mask, and the background image are processed by using the video synthesis model to obtain an output image. According to this method, feature extraction and feature fusion can be performed on two to-be-synthesized videos by using the video synthesis model, so as to generate a more accurate foreground image, foreground mask, and background image, thereby improving the feasibility and reliability of the solution.

Based on the embodiment corresponding to FIG. 3, in some embodiments of this application, the obtaining, by the video synthesis apparatus, a foreground fusion feature corresponding to the foreground feature set by using the video synthesis model may include:

determining, by the video synthesis apparatus, K frames of foreground attention mask maps according to the foreground feature set, the source motion key point of the each frame of source image information in the K frames of source image information, and the first target motion key point; and determining, by the video synthesis apparatus, the foreground fusion feature according to the K frames of foreground attention mask maps and the foreground feature set.

In this embodiment, a method for determining a foreground fusion feature is introduced. Specifically, the video synthesis apparatus first learns the foreground feature set, the source motion key point of the each frame of source image information in the K frames of source image information, and the first target motion key point to obtain K frames of foreground attention mask maps, that is, a plurality of foreground attention mask maps are predicted from the plurality of frames of source image information, and multi-frame weight allocation is automatically learned during the prediction process. After the K frames of foreground attention mask maps are obtained, the foreground feature set and the K frames of foreground attention mask maps are fused to obtain the foreground fusion feature.

Figure 6:
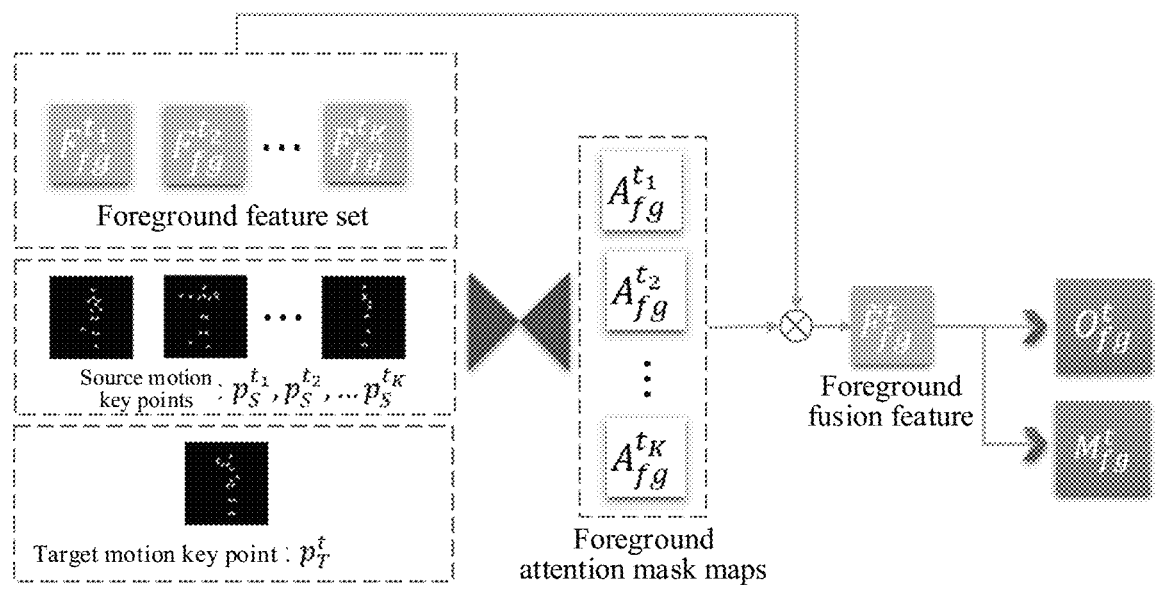
FIG. 6 is a schematic structural diagram of a feature aggregation module according to an embodiment of this application.

FIG. 6 is a schematic structural diagram of a feature aggregation module according to an embodiment of this application. As shown in FIG. 6, a foreground feature set ($F_{f_g}^{t1}, F_{f_g}^{t2}, \ldots F_{f_g}^{tK}$), K frames of source motion key points ($p_S^{t1}, p_S^{t2}, \ldots p_S^{tK}$) and a target motion key point ($p_T^t$) are learned to obtain foreground attention mask maps ($A_{f_g}^{t1}, A_{f_g}^{t2}, \ldots A_{f_g}^{tK}$) with K channels. Next, the K frames of foreground attention mask maps ($A_{f_g}^{t1}, A_{f_g}^{t2}, \ldots A_{f_g}^{tK}$) and the foreground feature set ($F_{f_g}^{t1}, F_{f_g}^{t2}, \ldots F_{f_g}^{tK}$) need to be multiplied to generate a foreground fusion feature ($\tilde{F}_{f_g}^t$). Convolution processing is performed on the foreground fusion feature ($\tilde{F}_{f_g}^t$) to obtain a foreground image ($O_{f_g}$) and a foreground mask ($M_{f_g}$).

Next, in the embodiments of this application, a method for obtaining a foreground fusion feature is provided. The K frames of foreground attention mask maps are first determined according to the foreground feature set, the source motion key point of the each frame of source image information in the K frames of source image information, and the first target motion key point; and then the foreground fusion feature is determined according to the K frames of foreground attention mask maps and the foreground feature set. According to the foregoing method, a plurality of frames of source image information is used to generate a foreground feature set, and therefore information association between consecutive frames can be effectively used, thereby further enhancing continuity of a synthesized video in the time domain.

Based on the embodiment corresponding to FIG. 3, in some embodiments of the video synthesis method, the determining, by the video synthesis apparatus, the foreground fusion feature according to the K frames of foreground attention mask maps and the foreground feature set may include:

calculating, by the video synthesis apparatus, the foreground fusion feature in the following manner:

$$\tilde{F}_{f_g}^{t} = \Sigma_{k=1}^{K} \odot A_{f_g}^{t_k},$$

$\tilde{F}_{f_g}^{t}$ representing the foreground fusion feature, $\tilde{F}_{f_g}^{t}$ representing a $k^{th}$ frame of foreground feature in the foreground feature set, $A_{f_g}^{t_k}$ representing a $k^{th}$ frame of foreground attention mask map in the K frames of foreground attention mask maps, and $\odot$ representing pixel multiplication.

In this embodiment, a specific method for calculating a foreground fusion feature is introduced. After the $K^{th}$ frame of foreground attention mask map is generated, the following method is used to calculate the foreground fusion feature:

$$\tilde{F}_{f_g}^{t} = \Sigma_{k=1}^{K} F_{f_g}^{t_k} \odot A_{f_g}^{t_k}.$$

Therefore, the foreground fusion feature $\tilde{F}_{f_g}^{t}$ can be obtained by using this calculation method.

Further, in an embodiment of this application, a specific method for calculating a foreground fusion feature is provided. According to the foregoing method, a specific basis can be provided for the implementation of the solution, thereby improving the feasibility and operability of calculating the foreground fusion feature.

Based on the embodiment corresponding to FIG. 3, in some embodiments of this application, the obtaining, by the video synthesis apparatus, a background fusion feature corresponding to the background feature set by using the video synthesis model may include:

determining, by the video synthesis apparatus, K frames of background attention mask maps according to the background feature set, the source motion key point of the each frame of source image information in the K frames of source image information, and the first target motion key point; and determining, by the video synthesis apparatus, the background fusion feature according to the K frames of background attention mask maps and the background feature set.

In this embodiment, a method for determining a background fusion feature is introduced. Specifically, the video synthesis apparatus first learns the background feature set, the source motion key point of the each frame of source image information in the K frames of source image information, and the first target motion key point to obtain K frames of background attention mask maps, that is, a plurality of background attention mask maps are predicted from the plurality of frames of source image information, and multi-frame weight allocation is automatically learned during the prediction process. After the K frames of background attention mask maps are obtained, the background feature set and the K frames of background attention mask maps are fused to obtain the background fusion feature.

Similar to the diagram in FIG. 6, a background feature set $(F_{b_g}^{t_1}, F_{b_g}^{t_2}, \ldots F_{b_g}^{t_k})$, the K frames of source motion key points $(p_S^{t_1}, p_S^{t_2}, \ldots p_S^{t_k})$, and the target motion key point $(p_T^{t})$ need to be first learned to obtain background attention mask maps $(A_{b_g}^{t_1}, A_{b_g}^{t_2}, \ldots A_{b_g}^{t_k})$ with K channels. Next, the K frames of background attention mask maps $(A_{b_g}^{t_1}, A_{b_g}^{t_2}, \ldots A_{b_g}^{t_k})$ and the background feature set $(F_{b_g}^{t_1}, F_{b_g}^{t_2}, \ldots F_{b_g}^{t_k})$ need to be multiplied to generate a background fusion feature $(\tilde{F}_{b_g}^{t})$. Convolution processing is performed on the background fusion feature $(\tilde{F}_{b_g}^{t})$ to obtain a background image $(O_{b_g})$.

Next, in the embodiments of this application, a method for obtaining a background fusion feature is provided. The K frames of background attention mask maps are first determined according to the background feature set, the source motion key point of the each frame of source image information in the K frames of source image information, and the first target motion key point; and then the background fusion feature is determined according to the K frames of background attention mask maps and the background feature set. According to the foregoing method, a plurality of frames of source image information is used to generate a background feature set, and therefore information association between consecutive frames can be effectively used, thereby further enhancing continuity of a synthesized video in the time domain.

Based on the embodiment corresponding to FIG. 3, in some embodiments of this application, the determining, by the video synthesis apparatus, the background fusion feature according to the K frames of background attention mask maps and the background feature set includes:

calculating, by the video synthesis apparatus, the background fusion feature in the following manner:

$$\tilde{F}_{b_g}^{t} = \Sigma_{k=1}^{K} F_{b_g}^{t_k} \odot A_{b_g}^{t_k},$$

$\tilde{F}_{b_g}^{t}$ representing the background fusion feature, $F_{b_g}^{t_k}$ representing a $k^{th}$ frame of background feature in the background feature set, $A_{b_g}^{t_k}$ representing a $k^{th}$ frame of background attention mask map in the K frames of background attention mask maps, and $\odot$ representing pixel multiplication.

In this embodiment, a specific method for calculating a background fusion feature is introduced. After the $K^{th}$ frame of background attention mask map is generated, the following method is used to calculate the background fusion feature:

$$\tilde{F}_{b_g}^{t} = \Sigma_{k=1}^{K} \odot A_{b_g}^{t_k}.$$

Therefore, the background fusion feature can be obtained by using this calculation method.

Further, in an embodiment of this application, a specific method for calculating a background fusion feature is provided. According to the foregoing method, a specific basis can be provided for the implementation of the solution, thereby improving the feasibility and operability of calculating the background fusion feature.

Based on the embodiment corresponding to FIG. 3, in some embodiments of this application, the processing, by the video synthesis apparatus, the foreground image, the foreground mask, and the background image by using the video synthesis model to obtain the first output image may include:

calculating, by the video synthesis apparatus, the first output image in the following manner:

$$O^{t} = O_{f_g}^{t} \odot M_{f_g}^{t} + O_{b_g}^{t}(1 - M_{f_g}^{t}),$$

$O^{t}$ representing the first output image corresponding to a $t^{th}$ frame, $O_{f_g}^{t}$ representing the foreground image corresponding to the $t^{th}$ frame, $O_{b_g}^{t}$ representing the background image corresponding to the $t^{th}$ frame, $M_{f_g}^{t}$ representing the foreground mask corresponding to the $t^{th}$ frame, and $\odot$ representing pixel multiplication.

In this embodiment, a specific method for calculating the output image is introduced. After the foreground image, the foreground mask, and the background image are obtained, the first output image can be calculated in the following manner. It is understandable that another output image may also be processed in this manner, which is not repeated herein.

The first output image is calculated in the following manner:

$$O^t = O_{f_g}^t \odot M_{f_g}^t + O_{b_g}^t (1 - M_{f_g}^t).$$

Therefore, the first output image $O^t$ can be obtained by using this calculation method.

Next, in an embodiment of this application, a specific method for processing the foreground image, the foreground mask, and the background image by using the video synthesis model to obtain the output image is provided. According to the foregoing method, a specific basis can be provided for the implementation of the solution, thereby improving the feasibility and operability of calculating the output image.

Based on FIG. 3, in some embodiments of this application, before the generating, by the video synthesis apparatus, a synthesized video according to the motion reference sequence and the first output image, the method may further include:

obtaining, by the video synthesis apparatus, a second output image corresponding to the K frames of source image information and a second target motion key point by using the video synthesis model, the second output image including the transfer object, and the second target motion key point being a target motion key point in the plurality of frames of target image information; and the generating, by the video synthesis apparatus, a synthesized video according to the motion reference sequence and the first output image may include:

processing, by the video synthesis apparatus, the first output image and the second output image according to the motion reference sequence to obtain the synthesized video.

In this embodiment, a synthesized video generation method is introduced. In a possible implementation, before the first output image is obtained, another output image may be further obtained. The following takes the generation of a second output image as an example for description. It is understandable that the second output image may be generated before the first output image, or may be generated after the first output image, which is not limited herein. If the second output image is generated before the first output image, the second output image usually appears before the first output image in the synthesized video. If the second output image is generated after the first output image, the second output image usually appears after the first output image in the synthesized video.

For the method for generating the second output image, refer to the specific content described in the foregoing embodiments, that is, the second target motion key point in the second to-be-synthesized video is first obtained, then the K frames of source image information and the second target motion key point are inputted to the video synthesis model, and the corresponding second output image is outputted by the video synthesis model. Finally, according to an image stitching order indicated by the motion reference sequence, the first output image and the second output image are stitched to generate the synthesized video.

Furthermore, in an embodiment of this application, a synthesized video generation method is provided, that is, before the synthesized video is generated, the method may further include: first obtaining a second output image corresponding to the K frames of source image information and a second target motion key point by using the video synthesis model, the second output image also including the transfer object, and the second target motion key point being a target motion key point in the plurality of frames of target image information; and then processing the first output image and the second output image according to the motion reference sequence to obtain the synthesized video. According to the foregoing method, in practical applications, another output image can be generated using the method provided in this application, and then a plurality of frames of output images are stitched in an order defined by the motion reference sequence to obtain the finally synthesized video, thereby improving the operability and feasibility of the solution.

Figure 7:
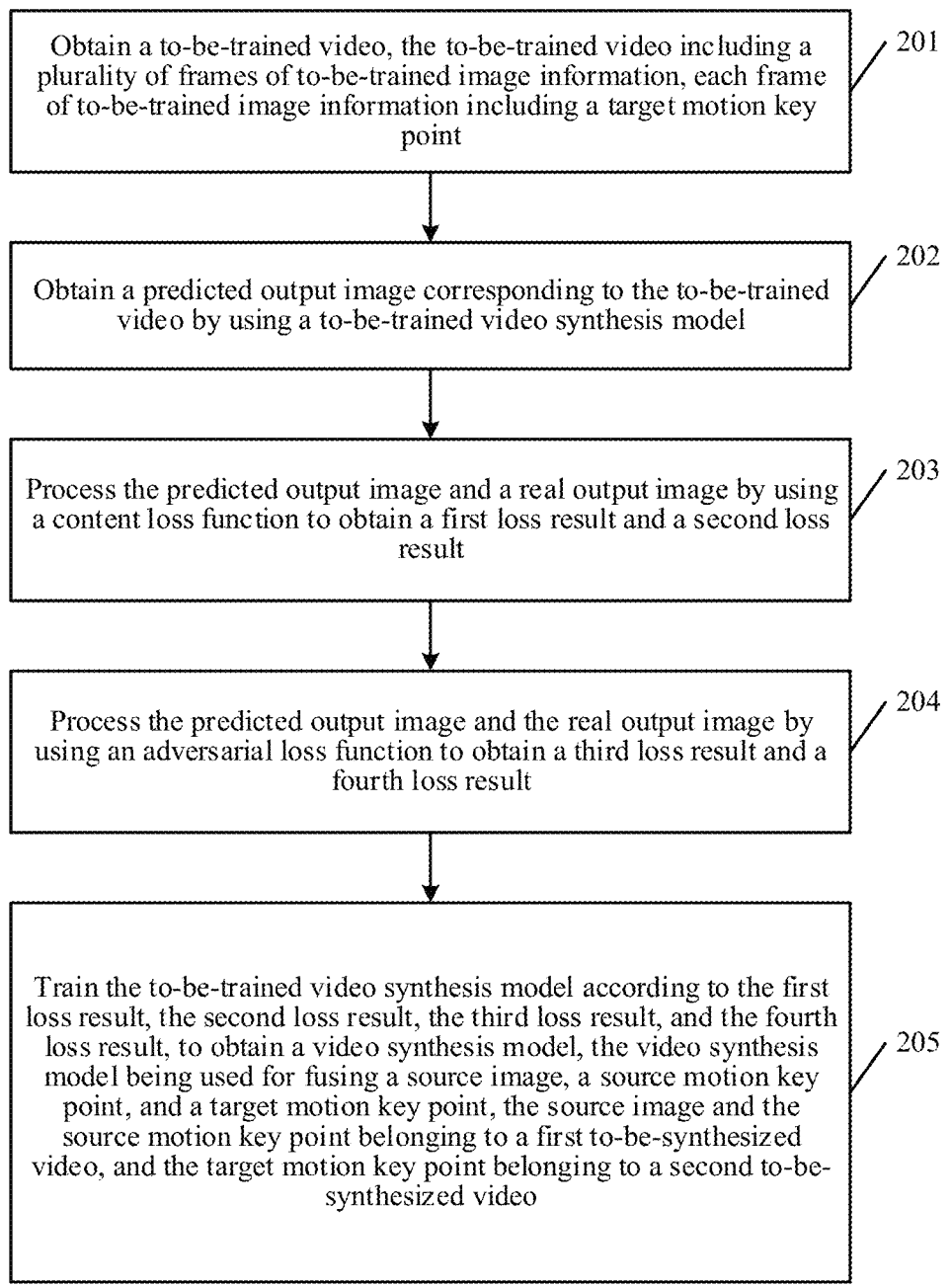
FIG. 7 is a schematic diagram of an embodiment of a model training method according to an embodiment of this application.

The model training method according to this application is described below with reference to the foregoing descriptions. Referring to FIG. 7, an embodiment of the model training method according to an embodiment of this application includes the following steps:

201: A server obtains a to-be-trained video, the to-be-trained video including a plurality of frames of to-be-trained image information, each frame of to-be-trained image information including a target motion key point.

In this embodiment, during the training process, the model training apparatus first needs to obtain the to-be-trained video, and the model training apparatus is usually deployed on the server. It can be understood that in practical applications, a large quantity of to-be-trained videos can be obtained for learning. Any one of the to-be-trained videos is taken as an example for illustration, but this is not to be understood as a limitation of this application.

The to-be-trained video includes the plurality of frames of to-be-trained image information, and each frame of to-be-trained image information includes an image, and a target motion key point of an object. The target motion key point may be a head key point, an elbow key point, a neck key point, a knee key point, or a shoulder key point of a person.

202: The server obtains a predicted output image corresponding to the to-be-trained video by using a to-be-trained video synthesis model.

In this embodiment, the to-be-trained video is inputted to the to-be-trained video synthesis model, where the to-be-trained video synthesis model may be an initial model or a model that needs to be further trained, which is not limited herein. The to-be-trained video synthesis model outputs the corresponding predicted output image according to the inputted to-be-trained video.

203: The server processes the predicted output image and a real output image by using a content loss function to obtain a first loss result and a second loss result.

In this embodiment, because content of the to-be-trained video is known, the real output image corresponding to the to-be-trained video can be obtained. Therefore, the model training apparatus can process the predicted output image and the real output image by using a content loss function to obtain a first loss result and a second loss result.

The loss function is used for estimating an inconsistency degree between a predicted value and a true value of a model and is a non-negative real-valued function, which is usually expressed by L. The smaller the loss function, the better the robustness of the model. The loss function is a core part of an empirical risk function and also an important component of a structural risk function. The content loss function in this application includes but is not limited to at least one of a cross entropy loss function, a softmax loss function, a hinge loss function, a square loss function, and an exponential loss function.

204: The server processes the predicted output image and the real output image by using an adversarial loss function to obtain a third loss result and a fourth loss result.

In this embodiment, the model training apparatus can further process the predicted output image and the real output image by using an adversarial loss function to obtain a third loss result and a fourth loss result. The adversarial loss function and the content loss function play different roles. The content loss function is used for making a predicted image and a real image as similar as possible. The adversarial loss function is used for making it difficult to distinguish between a predicted image and a real image, which means that the predicted image can be recognized as the real image, so as to further improve the overall quality of the predicted image.

205: The server trains the to-be-trained video synthesis model according to the first loss result, the second loss result, the third loss result, and the fourth loss result, to obtain a video synthesis model, the video synthesis model being used for fusing a source image, a source motion key point, and a target motion key point, the source image and the source motion key point belonging to a first to-be-synthesized video, and the target motion key point belonging to a second to-be-synthesized video.

In this embodiment, finally, the model training apparatus calculates a total loss result according to the first loss result, the second loss result, the third loss result, and the fourth loss result, then calculates a model parameter according to the total loss result, and trains the to-be-trained video synthesis model by using the model parameter to obtain the video synthesis model. The video synthesis model can fuse the source image and the source motion key point belonging to the first to-be-synthesized video, and the target motion key point belonging to the second to-be-synthesized video, to finally generate an output image. A synthesized video is stitched together from a plurality of output images.

In this embodiment of this application, a model training method is provided. First, a to-be-trained video is obtained; then, a predicted output image corresponding to the to-be-trained video is obtained by using a to-be-trained video synthesis model; next, the predicted output image and a real output image are processed by using a content loss function to obtain a first loss result and a second loss result; then the predicted output image and the real output image are processed by using an adversarial loss function to obtain a third loss result and a fourth loss result; and finally, the to-be-trained video synthesis model is trained according to the first loss result, the second loss result, the third loss result, and the fourth loss result, to obtain a video synthesis model. According to this method, in the training process of the model, a main appearance feature and background of an input picture can be retained by using a set constraint and a motion sequence of a motion reference video. Such capabilities enable a specific motion sequence to be quickly applied to a character and a scenario with the appearance of a target body well maintained.

Based on the embodiment corresponding to FIG. 7, in some embodiments of a model training method according to an embodiment of this application, the processing, by the server, the predicted output image and a real output image by using a content loss function to obtain a first loss result and a second loss result may include:

performing, by the server, feature extraction on the predicted output image to obtain a predicted image feature, and performing feature extraction on the real output image to obtain a real image feature;

calculating, by the server, the predicted output image and the real output image by using a mean square error loss function to obtain the first loss result; and calculating, by the server, the predicted image feature and the real image feature by using a VGG loss function to obtain the second loss result; and the processing, by the server, the predicted output image and the real output image by using an adversarial loss function to obtain a third loss result and a fourth loss result may include:

calculating, by the server, the predicted output image, the real output image, and the target motion key point by using a single-frame adversarial loss function and an image reality discriminator to obtain the third loss result; and calculating, by the server, a predicted output video and a real output video by using a time-domain adversarial loss function and a video reality discriminator to obtain the fourth loss result, the predicted output video including a plurality of frames of predicted output images, and the real output video including a plurality of frames of real output images.

In this embodiment, types of loss functions used in this application are introduced. The loss function is only used for model training, and there is no need to use the loss function in actual prediction. A content loss function can specifically include two types of loss functions, one of which is a mean square error (MSE) loss function, and the other of which is a VGG loss function. The MSE loss function is responsible for capturing a pixel-level loss and preventing an excessive deviation in a generated result. MSE refers to an expected value of the square of the difference between a predicted value and a true value of a parameter. MSE can evaluate the degree of data change. The smaller the value of MSE, the better the accuracy of the prediction model to describe experimental data. The VGG loss function is responsible for measuring a perceptual loss, so that a finally generated result has a better visual quality.

An adversarial loss function can specifically include two types of loss functions, one of which is a single-frame adversarial loss function, and the other of which is a time-domain adversarial loss function. The adversarial loss function includes a generator and a discriminator. The loss principle of the discriminator for fake data is that an objective to be achieved is to output 1 for all real pictures, and output 0 for all fake pictures. An objective of the generator is to fool the discriminator. The goal that needs to be achieved is to output 1 for a generated picture, just the opposite of the discriminator. The single-frame adversarial loss function is responsible for improving spatial details of a generated result. A target that the time-domain adversarial loss function trains is a video, which includes a plurality of frames of images. The use of a multi-frame discriminator can reduce the time-domain jitter and flicker in a generated result.

Next, in this embodiment of this application, a loss result obtaining method is provided. A predicted output image and a real output image are calculated by using a mean square error loss function to obtain the first loss result; a predicted image feature and a real image feature are calculated by using a VGG loss function to obtain the second loss result; the predicted output image, the real output image, and the target motion key point are calculated by using a single-frame adversarial loss function and an image reality discriminator to obtain the third loss result; and the predicted output video and the real output video are calculated by using a time-domain adversarial loss function and the video reality discriminator to obtain the fourth loss result, the predicted output video including a plurality of frames of predicted output images, and the real output video including a plurality of frames of real output images. According to this method, the mean square error loss function can be used to be responsible for capturing a pixel-level loss and preventing an excessive deviation in a generated result, and the VGG loss function can be used to be responsible for measuring a perceptual loss, so that a finally generated result has a better visual quality. The adversarial loss function can be used to ensure that a generated predicted image and a real image are not easy to distinguish, thereby further improving the quality of the generated image.

Based on the embodiment corresponding to FIG. 7, in some embodiments of a model training method according to an embodiment of this application, the calculating, by the server, the predicted output image and the real output image by using a mean square error loss function to obtain the first loss result may include:

calculating, by the server, the first loss result in the following manner:

$$L_{MSE}=\Sigma_t\|O^t-I_T^t\|_2^2,$$

$L_{MSE}$ representing the first loss result, $O^t$ representing the predicted output image, $I_T^t$ representing the real output image, and t representing a frame number of an image;

the calculating, by the server, the predicted image feature and the real image feature by using a VGG loss function to obtain the second loss result may include:

calculating, by the server, the second loss result in the following manner:

$$L_{VGG}=\Sigma_t\|\phi(O^t)-\phi(I_T^t)\|_2,$$

$L_{VGG}$ representing the second loss result, $\phi(O^t)$ representing the predicted image feature, and $\phi(I_T^t)$ representing the real image feature;

the calculating, by the server, the predicted output image, the real output image, and the target motion key point by using a single-frame adversarial loss function and an image reality discriminator to obtain the third loss result may include:

calculating, by the server, the third loss result in the following manner:

$$L_{GAN,I}=\Sigma_t\|D_I(I_T^t,p_T^t)\|_2^2+\|1-D_I(O_t,p_T^t)\|_2^2,$$

$L_{GAN,I}$ representing the third loss result, $D_I$ representing the image reality discriminator, and $p_T^t$ representing the target motion key point; and the calculating, by the server, a predicted output video and a real output video by using a time-domain adversarial loss function and a video reality discriminator to obtain the fourth loss result may include:

calculating, by the server, the fourth loss result in the following manner:

$$L_{GAN,V}=\Sigma_n\Sigma_t\|D_V^n(V_T^{[t-n+1,t]},W_T^{[t-n+2,t]})\|_2^2+\|1-D_V^n(V_O^{[t-n+1,t]},W_T^{[t-n+2,t]})\|_2^2,$$

$L_{GAN,V}$ representing the fourth loss result, $D_V^n$ representing the video reality discriminator, $V_T^{[t-n+1,t]}$ representing the predicted output video, $V_O^{[t-n+1,t]}$ representing the real output video, $W_T^{[t-n+2,t]}$ representing optical flow information, and n representing a number of image frames used by the video reality discriminator.

In this embodiment, how to use different loss functions to calculate corresponding loss results is introduced. For the MSE loss function, a loss result can be calculated in the following manner:

$$L_{MSE}=\Sigma_t\|O^t-I_T^t\|_2^2.$$

That is, each frame of predicted output image in the to-be-trained video and the corresponding real output image are calculated, where the superscript "2" represents square calculation, and the subscript "2" represents the norm of 2.

For the VGG loss function, a loss result can be calculated in the following manner:

$$L_{VGG}=\Sigma_t\|\phi(O^t)-\phi(I_T^t)\|_2.$$

In a possible implementation, features of the predicted output image and the real output image need to be extracted first, that is, the feature of the predicted output image is extracted to obtain the predicted image feature, and the feature of the real output image is extracted to obtain the real image feature. Then, the real image feature corresponding to each frame of image and the predicted output image corresponding to the each frame of image in the to-be-trained video are calculated.

For the single-frame adversarial loss function, a loss result can be calculated in the following manner:

$$L_{GAN,I}=\Sigma_t\|D_I(I_T^t,p_T^t)\|_2^2+\|1-D_I(O^t,p_T^t)\|_2^2.$$

In a possible implementation, the server inputs the real output image and the target motion key point to the image reality discriminator, and meanwhile also inputs the predicted output image and the target motion key point to the image reality discriminator, to obtain the third loss result by integrating discrimination results of the image reality discriminator.

For the time-domain adversarial loss function, a loss result can be calculated in the following manner:

$$L_{GAN,V}=\Sigma_n\Sigma_t\|D_V^n(V_T^{[t-n+1,t]},W_T^{[t-n+2,t]})\|_2^2+\|1-D_V^n(V_O^{[t-n+1,t]},W_T^{[t-n+2,t]})\|_2^2.$$

In a possible implementation, the server inputs the predicted output video and optical flow information to the video reality discriminator, and meanwhile inputs the real output video and optical flow information to the video reality discriminator, where the predicted output video and the real output video each include n frames of images. In this application, n can be set to 3, 5, or 7. In practical applications, n can be set to another number of frames, and this is just for illustration herein. The multi-frame image adversariness can reduce the time-domain jitter and flicker in a generated result. The optical flow information is obtained based on two frames of images. The optical flow expresses a change of an image. Because the optical flow includes motion information of a target, the optical flow can be used by an observer to determine a motion situation of the target.

Next, in the embodiments of this application, specific calculation methods for the four types of loss results are provided, that is, specific calculation formulas are provided. According to the foregoing method, a specific basis can be provided for the implementation of the solution, thereby improving the feasibility and operability of calculating the loss result.

Based on the embodiment corresponding to FIG. 7, in some embodiments of the model training method according to the embodiments of this application, the training, by the server, the to-be-trained video synthesis model according to the first loss result, the second loss result, the third loss result, and the fourth loss result, to obtain a video synthesis model may include:

calculating, by the server, a total loss result according to the first loss result, the second loss result, the third loss result, and the fourth loss result;

determining, by the server, a model parameter according to the total loss result; and training, by the server, the to-be-trained video synthesis model according to the model parameter to obtain the video synthesis model;

the calculating a total loss result according to the first loss result, the second loss result, the third loss result, and the fourth loss result may include:

calculating the total loss result in the following manner:

$$L_{total}=L_{MSE}+\lambda_{VGG}L_{VGG}+\lambda_{GI}L_{GAN,I}+\lambda_{GV}L_{GAN,V},$$

$L_{total}$ representing the total loss result, $L_{MSE}$ representing the first loss result, $\lambda_{VGG}$ representing a first weight coefficient, $L_{VGG}$ representing the second loss result, and $\lambda_{GI}$ representing a second weight coefficient, $L_{GAN,I}$ representing the third loss result, $\lambda_{GV}$ representing a third weight coefficient, and $L_{GAN,V}$ representing the fourth loss result; and the determining a model parameter according to the total loss result may include:

calculating the model parameter in the following manner:

$$\operatorname*{argmin}_{G} \operatorname*{max}_{D_I,D_V} L_{total}(G, D_I, D_V),$$

$$\operatorname*{argmin}_{G} \operatorname*{max}_{D_I,D_V} ()$$

representing a variable value in a case that a function takes a maximum or minimum, G representing the model parameter, $D_I$ representing the image reality discriminator, and $D_V$ representing the video reality discriminator.

In this embodiment, a method for determining a model parameter is introduced. In a possible implementation, the model training apparatus first needs to calculate a total loss result according to the first loss result, the second loss result, the third loss result, and the fourth loss result. A calculation method is as follows:

$$L_{total}=L_{MSE}+\lambda_{VGG}L_{VGG}+\lambda_{GI}L_{GAN,I}+\lambda_{GV}L_{GAN,V},$$

where $\lambda_{VGG}$ represents the first weight coefficient, which is the weight coefficient corresponding to a result of the VGG loss function, $\lambda_{GI}$ represents the second weight coefficient, which is the weight coefficient corresponding to a result of the single-frame adversarial loss function, and $\lambda_{GV}$ represents the third weight coefficient, which is the weight coefficient corresponding to a result of the time-domain adversarial loss function. Assuming that $\lambda_{VGG}$ is 0.3, $\lambda_{GI}$ is 0.2, and $\lambda_{GV}$ is 0.5, and assuming that the calculated first loss result $L_{MSE}$ is 10, the calculated second loss result $L_{VGG}$ is 15, the calculated third loss result $L_{GAN,I}$ is 20, and the calculated fourth loss result $L_{GAN,V}$ is 5, the total loss result $L_{total}$ may be:

$$L_{total} = L_{MSE} + \lambda_{VGG}L_{VGG} + \lambda_{GI}L_{GAN,I} + \lambda_{GV}L_{GAN,V}$$
$$= 10 + 0.3*15 + 0.2*20 + 0.5*5$$
$$= 21$$

It can be understood that the values substituted into the formula are only for illustration, not a limitation of this application. Based on the calculated total loss result $L_{total}$, in the training process, the generator iteratively updates the weights for the purpose of reducing the total loss result $L_{total}$. The discriminators (including the image reality discriminator and the video reality discriminator) antagonize the total loss result $L_{total}$, that is:

$$\operatorname*{argmin}_{G} \operatorname*{max}_{D_I,D_V} L_{total}(G, D_I, D_V).$$

In other words, a value of the model parameter G depends on values of the image reality discriminator $D_I$ and the video reality discriminator $D_V$. When the image reality discriminator $D_I$ and the video reality discriminator $D_V$ are at maximum values, a minimum value of the model parameter G can be obtained.

Further, in the embodiments of this application, a specific method for calculating a model parameter according to a total loss result is provided. According to the foregoing method, a specific basis can be provided for the implementation of the solution, thereby improving the feasibility and operability of calculating the model parameter.

Figure 8:
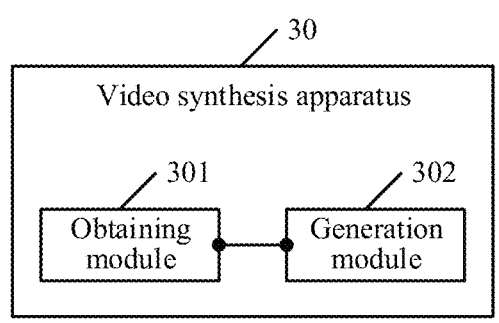
FIG. 8 is a schematic diagram of an embodiment of a video synthesis apparatus according to an embodiment of this application.

A video synthesis apparatus in this application is described below in detail. Referring to FIG. 8, FIG. 8 is a schematic diagram of an embodiment of a video synthesis apparatus according to an embodiment of this application. The video synthesis apparatus 30 includes:

an obtaining module 301, configured to obtain K frames of source image information of a first to-be-synthesized video, each frame of source image information including a source image and a source motion key point, the source image and the source motion key point corresponding to each other, the source image including a transfer object, and K being an integer greater than 1, where the obtaining module 301 is further configured to obtain a plurality of frames of target image information of a second to-be-synthesized video, each frame of target image information including a target motion key point, the second to-be-synthesized video corresponding to a motion reference sequence, the motion reference sequence being used for indicating an image order of video synthesis; and the obtaining module 301 is further configured to obtain a first output image corresponding to the K frames of source image information and a first target motion key point by using a video synthesis model, the video synthesis model being used for fusing the source image, the source motion key point, and the target motion key point, the first output image including the transfer object, and the first target motion key point being a target motion key point in the plurality of frames of target image information; and a generation module 302, configured to generate a synthesized video according to the motion reference sequence obtained by the obtaining module 301 and the first output image obtained by the obtaining module 301.

In this embodiment, an obtaining module 301 obtains K frames of source image information of a first to-be-synthesized video, each frame of source image information including a source image and a source motion key point, the source image and the source motion key point corresponding to each other, the source image including a transfer object, and K being an integer greater than 1; the obtaining module 301 obtains a plurality of frames of target image information of a second to-be-synthesized video, each frame of target image information including a target motion key point, the second to-be-synthesized video corresponding to a motion reference sequence, the motion reference sequence being used for indicating an image order of video synthesis; the obtaining module 301 obtains a first output image corresponding to the K frames of source image information and a first target motion key point by using a video synthesis model, the video synthesis model being used for fusing the source image, the source motion key point, and the target motion key point, the first output image including the transfer object, and the first target motion key point being a target motion key point in the plurality of frames of target image information; and a generation module 302 generates a synthesized video according to the motion reference sequence obtained by the obtaining module 301 and the first output image obtained by the obtaining module 301.

According to the embodiments of this application, a video synthesis apparatus is provided. The video synthesis apparatus first obtains K frames of source image information of a first to-be-synthesized video, each frame of source image information including a source image and a source motion key point, the source image including a transfer object; obtains a plurality of frames of target image information of a second to-be-synthesized video, each frame of target image information including a target motion key point, the second to-be-synthesized video corresponding to a motion reference sequence, the motion reference sequence being used for indicating an image order of video synthesis; then obtains a first output image corresponding to the K frames of source image information and a first target motion key point by using a video synthesis model, the video synthesis model being used for fusing the source image, the source motion key point, and the target motion key point, the first output image including the transfer object, and the first target motion key point being a target motion key point in the plurality of frames of target image information; and finally generates a synthesized video according to the motion reference sequence and the first output image. According to the foregoing method, a plurality of frames of source image information can be used to generate an output image corresponding to a motion sequence, and therefore information association between consecutive frames is fully taken into account, thereby enhancing continuity of a synthesized video in the time domain.

Based on the embodiment corresponding to FIG. 8, in some embodiments of the video synthesis apparatus 30 provided in the embodiments of this application, the obtaining module 301 is specifically configured to perform feature extraction on the K frames of source image information and the first target motion key point by using the video synthesis model to obtain a foreground feature set and a background feature set, the foreground feature set including K foreground features, the background feature set including K background features;

obtain a foreground fusion feature corresponding to the foreground feature set by using the video synthesis model;

obtain a background fusion feature corresponding to the background feature set by using the video synthesis model;

perform convolution processing on the foreground fusion feature by using the video synthesis model to obtain a foreground image and a foreground mask, the foreground mask being used for extracting an image contour;

perform convolution processing on the background fusion feature by using the video synthesis model to obtain a background image; and process the foreground image, the foreground mask, and the background image by using the video synthesis model to obtain the first output image.

Next, in the embodiments of this application, an output image generation method is provided. First, feature extraction is performed on K frames of source image information and a target motion key point by using a video synthesis model to obtain a foreground feature set and a background feature set; then, a foreground fusion feature corresponding to the foreground feature set is obtained by using the video synthesis model; a background fusion feature corresponding to the background feature set is obtained by using the video synthesis model; next, convolution processing is performed on the foreground fusion feature by using the video synthesis model to obtain a foreground image and a foreground mask; convolution processing is performed on the background fusion feature by using the video synthesis model to obtain a background image; and finally, the foreground image, the foreground mask, and the background image are processed by using the video synthesis model to obtain an output image. According to this method, feature extraction and feature fusion can be performed on two to-be-synthesized videos by using the video synthesis model, so as to generate a more accurate foreground image, foreground mask, and background image, thereby improving the feasibility and reliability of the solution.

Based on the embodiment corresponding to FIG. 8, in some embodiments of the video synthesis apparatus 30 provided in the embodiments of this application, the obtaining module 301 is specifically configured to determine K frames of foreground attention mask maps according to the foreground feature set, the source motion key point of the each frame of source image information in the K frames of source image information, and the first target motion key point; and determine the foreground fusion feature according to the K frames of foreground attention mask maps and the foreground feature set.

Next, in the embodiments of this application, a method for obtaining a foreground fusion feature is provided. The K frames of foreground attention mask maps are first determined according to the foreground feature set, the source motion key point of the each frame of source image information in the K frames of source image information, and the first target motion key point; and then the foreground fusion feature is determined according to the K frames of foreground attention mask maps and the foreground feature set. According to the foregoing method, a plurality of frames of source image information is used to generate a foreground feature set, and therefore information association between consecutive frames can be effectively used, thereby further enhancing continuity of a synthesized video in the time domain.

Based on the embodiment corresponding to FIG. 8, in some embodiments of the video synthesis apparatus 30 provided in the embodiments of this application, the obtaining module 301 is specifically configured to calculate the foreground fusion feature in the following manner:

$$\tilde{F}_{f_g}^{t} = \Sigma_{k=1}^{K} F_{f_g}^{t_k} \odot A_{f_g}^{t_k},$$

$\tilde{F}_{f_g}^{t}$ representing the foreground fusion feature, $\tilde{F}_{f_g}^{t}$ representing a $k^{th}$ frame of foreground feature in the foreground feature set, $A_{f_g}^{t_k}$ representing a $k^{th}$ frame of foreground attention mask map in the K frames of foreground attention mask maps, and $\odot$ representing pixel multiplication.

Further, in an embodiment of this application, a specific method for calculating a foreground fusion feature is provided. According to the foregoing method, a specific basis can be provided for the implementation of the solution, thereby improving the feasibility and operability of calculating the foreground fusion feature.

Based on the embodiment corresponding to FIG. 8, in some embodiments of the video synthesis apparatus 30 provided in the embodiments of this application, the obtaining module 301 is specifically configured to determine K frames of background attention mask maps according to the background feature set, the source motion key point of the each frame of source image information in the K frames of source image information, and the first target motion key point; and determine the background fusion feature according to the K frames of background attention mask maps and the background feature set.

Next, in the embodiments of this application, a method for obtaining a background fusion feature is provided. The K frames of background attention mask maps are first determined according to the background feature set, the source motion key point of the each frame of source image information in the K frames of source image information, and the first target motion key point; and then the background fusion feature is determined according to the K frames of background attention mask maps and the background feature set. According to the foregoing method, a plurality of frames of source image information is used to generate a background feature set, and therefore information association between consecutive frames can be effectively used, thereby further enhancing continuity of a synthesized video in the time domain.

Based on the embodiment corresponding to FIG. 8, in some embodiments of the video synthesis apparatus 30 provided in the embodiments of this application, the obtaining module 301 is specifically configured to calculate the background fusion feature in the following manner:

$$\tilde{F}_{b_g}{}^t = \Sigma_{k=1}^K F_{b_g}{}^{t_k} \odot A_{b_g}{}^{t_k},$$

$\tilde{F}_{b_g}{}^t$ representing the background fusion feature, $F_{b_g}{}^{t_k}$ representing a $k^{th}$ frame of background feature in the background feature set, $A_{b_g}{}^{t_k}$ representing a $k^{th}$ frame of background attention mask map in the K frames of background attention mask maps, and $\odot$ representing pixel multiplication.

Further, in an embodiment of this application, a specific method for calculating a background fusion feature is provided. According to the foregoing method, a specific basis can be provided for the implementation of the solution, thereby improving the feasibility and operability of calculating the background fusion feature.

Based on the embodiment corresponding to FIG. 8, in some embodiments of the video synthesis apparatus 30 provided in the embodiments of this application, the obtaining module 301 is specifically configured to calculate the first output image in the following manner:

$$O^t = O_{f_g}{}^t \odot M_{f_g}{}^t + O_{b_g}{}^t (1 - M_{f_g}{}^t),$$

$O^t$ representing the first output image corresponding to a $t^{th}$ frame, $O_{f_g}{}^t$ representing the foreground image corresponding to the $t^{th}$ frame, $O_{b_g}{}^t$ representing the background image corresponding to the $t^{th}$ frame, $M_{f_g}{}^t$ representing the foreground mask corresponding to the $t^{th}$ frame, and $\odot$ representing pixel multiplication.

Next, in an embodiment of this application, a specific method for processing the foreground image, the foreground mask, and the background image by using the video synthesis model to obtain the output image is provided. According to the foregoing method, a specific basis can be provided for the implementation of the solution, thereby improving the feasibility and operability of calculating the output image.

Based on the embodiment corresponding to FIG. 8, in some embodiments of the video synthesis apparatus 30 provided in the embodiments of this application, the obtaining module 301 is further configured to obtain a second output image corresponding to the K frames of source image information and a second target motion key point by using the video synthesis model before the generation module generates a synthesized video according to the motion reference sequence and the first output image, the second output image including the transfer object, and the second target motion key point being a target motion key point in the plurality of frames of target image information; and the generation module 302 is specifically configured to process the first output image and the second output image according to the motion reference sequence to obtain the synthesized video.

Furthermore, in an embodiment of this application, a synthesized video generation method is provided, that is, before the synthesized video is generated, the method may further include: first obtaining a second output image corresponding to the K frames of source image information and a second target motion key point by using the video synthesis model, the second output image also including the transfer object, and the second target motion key point being a target motion key point in the plurality of frames of target image information; and then processing the first output image and the second output image according to the motion reference sequence to obtain the synthesized video. According to the foregoing method, in practical applications, another output image can be generated using the method provided in this application, and then a plurality of frames of output images are stitched in an order defined by the motion reference sequence to obtain the finally synthesized video, thereby improving the operability and feasibility of the solution.

Figure 9:
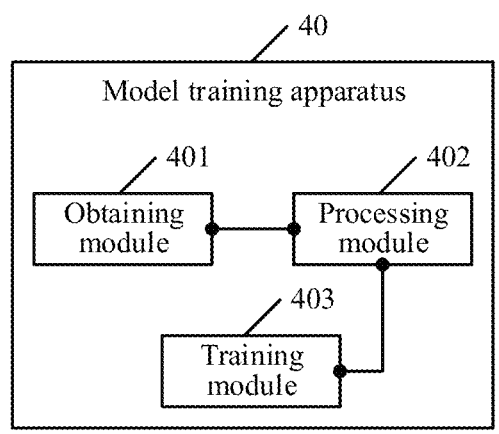
FIG. 9 is a schematic diagram of an embodiment of a model training apparatus according to an embodiment of this application.

A model training apparatus in this application is described below in detail. Referring to FIG. 9, FIG. 9 is a schematic diagram of an embodiment of a model training apparatus according to an embodiment of this application. The model training apparatus 40 includes:

an obtaining module 401, configured to obtain a to-be-trained video, the to-be-trained video including a plurality of frames of to-be-trained image information, each frame of to-be-trained image information including a target motion key point, where the obtaining module 401 is further configured to obtain a predicted output image corresponding to the to-be-trained video by using a to-be-trained video synthesis model;

a processing module 402, configured to process the predicted output image obtained by the obtaining module 401 and a real output image by using a content loss function to obtain a first loss result and a second loss result, where the processing module 402 is further configured to process the predicted output image obtained by the obtaining module 401 and the real output image by using an adversarial loss function to obtain a third loss result and a fourth loss result; and a training module 403, configured to train the to-be-trained video synthesis model according to the first loss result, the second loss result, the third loss result, and the fourth loss result obtained through processing of the processing module 402, to obtain a video synthesis model, the video synthesis model being used for fusing a source image, a source motion key point, and a target motion key point, the source image and the source motion key point belonging to a first to-be-synthesized video, and the target motion key point belonging to a second to-be-synthesized video.

In this embodiment, an obtaining module 401 obtains a to-be-trained video, the to-be-trained video including a plurality of frames of to-be-trained image information, each frame of to-be-trained image information including a target motion key point; the obtaining module 401 obtains a predicted output image corresponding to the to-be-trained video by using a to-be-trained video synthesis model; a processing module 402 processes the predicted output image obtained by the obtaining module 401 and a real output image by using a content loss function to obtain a first loss result and a second loss result; the processing module 402 processes the predicted output image obtained by the obtaining module 401 and the real output image by using an adversarial loss function to obtain a third loss result and a fourth loss result; and a training module 403 trains the to-be-trained video synthesis model according to the first loss result, the second loss result, the third loss result, and the fourth loss result obtained through processing of the processing module 402, to obtain a video synthesis model, the video synthesis model being used for fusing a source image, a source motion key point, and a target motion key point, the source image and the source motion key point belonging to a first to-be-synthesized video, and the target motion key point belonging to a second to-be-synthesized video.

In this embodiment of this application, a model training method is provided. First, a to-be-trained video is obtained; then, a predicted output image corresponding to the to-be-trained video is obtained by using a to-be-trained video synthesis model; next, the predicted output image and a real output image are processed by using a content loss function to obtain a first loss result and a second loss result; then, the predicted output image and the real output image are processed by using an adversarial loss function to obtain a third loss result and a fourth loss result; and finally, the to-be-trained video synthesis model is trained according to the first loss result, the second loss result, the third loss result, and the fourth loss result, to obtain a video synthesis model. According to this method, in the training process of the model, a main appearance feature and background of an input picture can be retained by using a set constraint and a motion sequence of a motion reference video. Such capabilities enable a specific motion sequence to be quickly applied to a character and a scenario with the appearance of a target body well maintained.

Based on the embodiment corresponding to FIG. 9, in some embodiments of the model training apparatus 40 provided in this embodiment of this application, the processing module 402 is specifically configured to perform feature extraction on the predicted output image to obtain a predicted image feature, and perform feature extraction on the real output image to obtain a real image feature;

calculate the predicted output image and the real output image by using a mean square error loss function to obtain the first loss result;

calculate the predicted image feature and the real image feature by using a VGG loss function to obtain the second loss result;

calculate the predicted output image, the real output image, and the target motion key point by using a single-frame adversarial loss function and an image reality discriminator to obtain the third loss result; and calculate a predicted output video and a real output video by using a time-domain adversarial loss function and a video reality discriminator to obtain the fourth loss result, the predicted output video including a plurality of frames of predicted output images, and the real output video including a plurality of frames of real output images.

Next, in this embodiment of this application, a loss result obtaining method is provided. A predicted output image and a real output image are calculated by using a mean square error loss function to obtain the first loss result; a predicted image feature and a real image feature are calculated by using a VGG loss function to obtain the second loss result; the predicted output image, the real output image, and the target motion key point are calculated by using a single-frame adversarial loss function and an image reality discriminator to obtain the third loss result; and the predicted output video and the real output video are calculated by using a time-domain adversarial loss function and the video reality discriminator to obtain the fourth loss result, the predicted output video including a plurality of frames of predicted output images, and the real output video including a plurality of frames of real output images. According to this method, the mean square error loss function can be used to be responsible for capturing a pixel-level loss and preventing an excessive deviation in a generated result, and the VGG loss function can be used to be responsible for measuring a perceptual loss, so that a finally generated result has a better visual quality. The adversarial loss function can be used to ensure that a generated predicted image and a real image are not easy to distinguish, thereby further improving the quality of the generated image.

Based on the embodiment corresponding to FIG. 9, in some embodiments of the model training apparatus 40 provided in this embodiment of this application, the processing module 402 is specifically configured to calculate the first loss result in the following manner:

$$L_{MSE} = \Sigma_t \| O^t - I_T^t \|_2^2,$$

$L_{MSE}$ representing the first loss result, $O^t$ representing the predicted output image, $I_T^t$ representing the real output image, and t representing a frame number of an image;

calculate the second loss result in the following manner:

$$L_{VGG} = \Sigma_t \| \phi(O^t) - \phi(I_T^t) \|_2,$$

$L_{VGG}$ representing the second loss result, $\phi(O^t)$ representing the predicted image feature, and $\phi(I_T^t)$ representing the real image feature;

calculate the third loss result in the following manner:

$$L_{GAN,I} = \Sigma_t \| D_I(I_T^t, p_T^t) \|_2^2 + \| 1 - D_I(O^t, p_T^t)_2^2,$$

$L_{GAN,I}$ representing the third loss result, $D_I$ representing the image reality discriminator, and $p_T^t$ representing the target motion key point; and calculate the fourth loss result in the following manner:

$$L_{GAN,V} = \Sigma_n \Sigma_t \| D_V^n(V_T^{[t-n+1,t]}, W_T^{[t-n+2,t]}) \|_2^2 + \| 1 - D_V^n(V_O^{[t-n+1,t]}, W_T^{[t-n+2,t]}) \|_2^2,$$

$L_{GAN,V}$ representing the fourth loss result, $D_V^n$ representing the video reality discriminator, $V_T^{[t-n+1,t]}$ representing the predicted output video, $V_O^{[t-n+1,t]}$ representing the real output video, $W_T^{[t-n+2,t]}$ representing optical flow information, and n representing a number of image frames used by the video reality discriminator.

Next, in the embodiments of this application, specific calculation methods for the four types of loss results are provided, that is, specific calculation formulas are provided. According to the foregoing method, a specific basis can be provided for the implementation of the solution, thereby improving the feasibility and operability of calculating the loss result.

Based on the embodiment corresponding to FIG. 9, in another embodiment of the model training apparatus 40 provided in this embodiment of this application, the training module 403 is specifically configured to calculate a total loss result according to the first loss result, the second loss result, the third loss result, and the fourth loss result;

determine a model parameter according to the total loss result; and train the to-be-trained video synthesis model according to the model parameter to obtain the video synthesis model;
calculate the total loss result in the following manner:

$$L_{total} = L_{MSE} + \lambda_{VGG} L_{VGG} + \lambda_{GI} L_{GAN,I} + \lambda_{GV} L_{GAN,V},$$

$L_{total}$ representing the total loss result, $L_{MSE}$ representing the first loss result, $\lambda_{VGG}$ representing a first weight coefficient, $L_{VGG}$ representing the second loss result, and $\lambda_{GI}$ representing a second weight coefficient, $L_{GAN,I}$ representing the third loss result, $\lambda_{GV}$ representing a third weight coefficient, and $L_{GAN,V}$ representing the fourth loss result; and
calculate the model parameter in the following manner:

$$\operatorname*{argmin}_{G} \operatorname*{max}_{D_I, D_V} L_{total}(G, D_I, D_V),$$

$$\operatorname*{argmin}_{G} \operatorname*{max}_{D_I, D_V} (\,)$$

representing a variable value in a case that a function takes a maximum or minimum, G representing the model parameter, $D_I$ representing the image reality discriminator, and $D_V$ representing the video reality discriminator.

Further, in the embodiments of this application, a specific method for calculating a model parameter according to a total loss result is provided. According to the foregoing method, a specific basis can be provided for the implementation of the solution, thereby improving the feasibility and operability of calculating the model parameter.

Figure 10:
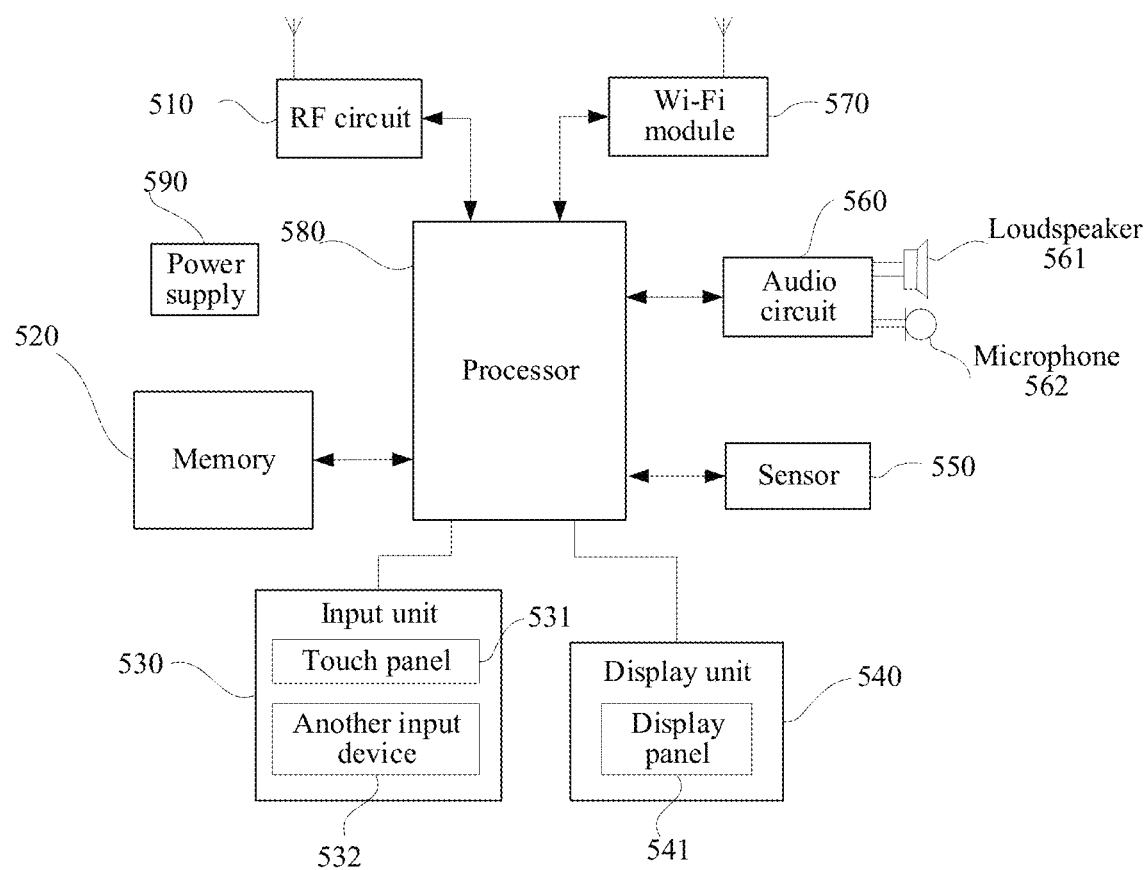
FIG. 10 is a schematic diagram of an embodiment of a terminal device according to an embodiment of this application.

An embodiment of this application further provides a terminal device for video synthesis. As shown in FIG. 10, for ease of description, only parts related to the embodiments of this application are shown. For specific technical details that are not disclosed, refer to the method part of the embodiments of this application. The terminal device may be any terminal device including a mobile phone, a tablet computer, a personal digital assistant (PDA), a point of sales (POS), and an on-board computer, and the terminal device being a mobile phone is used as an example.

FIG. 10 shows a block diagram of the structure of a part of a mobile phone related to a terminal device according to an embodiment of this application. Referring to FIG. 10, the mobile phone includes components such as a radio frequency (RF) circuit 510, a memory 520, an input unit 530, a display unit 540, a sensor 550, an audio circuit 560, a wireless fidelity (Wi-Fi) module 570, a processor 580, and a power supply 590. A person skilled in the art can understand that the structure of the mobile phone shown in FIG. 10 does not constitute a limitation to the mobile phone, and the mobile phone may include more components or fewer components than those shown in the figure, or some components may be combined, or a different component deployment may be used.

The following makes a specific description of components of the mobile phone with reference to FIG. 10.

The RF circuit 510 may be configured to receive and send signals during an information receiving and sending process or a call process. Particularly, the RF circuit receives downlink information from a base station, then delivers the downlink information to the processor 580 for processing, and sends involved uplink data to the base station. Usually, the RF circuit 510 includes, but is not limited to, an antenna, at least one amplifier, a transceiver, a coupler, a low noise amplifier (LNA), and a duplexer. In addition, the RF circuit 510 may further communicate with a network and another device by means of wireless communication. The wireless communication may use any communication standard or protocol, including but not limited to Global System for Mobile Communications (GSM), general packet radio service (GPRS), Code Division Multiple Access (CDMA), Wideband Code Division Multiple Access (WCDMA), Long Term Evolution (LTE), email, Short Messaging Service (SMS), and the like.

The memory 520 may be configured to store a software program and module. The processor 580 runs the software program and module stored in the memory 520, to implement various functional applications and data processing of the mobile phone. The memory 520 may include a program storage area and a data storage area, where the program storage area may store an operating system, an application program required by at least one function (such as a sound playback function and an image display function), and the like; and the data storage area may store data (such as audio data and a phone book) created according to use of the mobile phone, and the like. In addition, the memory 520 may include a high speed random access memory, and may alternatively include a non-volatile memory such as at least one magnetic disk storage device, a flash memory, or another volatile solid-state storage device.

The input unit 530 may be configured to receive input digit or character information, and generate a keyboard signal input related to the user setting and function control of the mobile phone. In a possible implementation, the input unit 530 may include a touch panel 531 and another input device 532. The touch panel 531, which may alternatively be referred to as a touch screen, may collect a touch operation of a user on or near the touch panel (such as an operation of a user on the touch panel 531 or near the touch panel 531 by using any suitable object or accessory such as a finger or a stylus), and drive a corresponding connection apparatus according to a preset program. In some embodiments, the touch panel 531 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and transmits the touch point coordinates to the processor 580. Moreover, the touch controller can receive and execute a command transmitted from the processor 580. In addition, the touch panel 531 may be a resistive, capacitive, infrared, or surface acoustic touch panel. Besides the touch panel 531, the input unit 530 may further include another input device 532. In a possible implementation, the another input device 532 may include, but is not limited to, one or more of a physical keyboard, a functional key (such as a volume control key and a switch key), a track ball, a mouse, and a joystick.

The display unit 540 may be configured to display information inputted by the user or information provided for the user, and various menus of the mobile phone. The display unit 540 may include a display panel 541. In some embodiments, the display panel 541 may be configured by using a liquid crystal display (LCD), an organic light-emitting diode (OLED), or the like. Further, the touch panel 531 may cover the display panel 541. After detecting a touch operation on or near the touch panel 531, the touch panel 531 transfers the touch operation to the processor 580, so as to determine a type of the touch event. Then, the processor 580 provides corresponding visual output on the display panel 541 according to the type of the touch event. Although in FIG. 10, the touch panel 531 and the display panel 541 are used as two separate parts to implement input and output functions of the mobile phone, in some embodiments, the touch panel 531 and the display panel 541 may be integrated to implement the input and output functions of the mobile phone.

The mobile phone may further include at least one sensor 550 such as an optical sensor, a motion sensor, and other sensors. In a possible implementation, the optical sensor may include an ambient light sensor and a proximity sensor. The ambient light sensor may adjust luminance of the display panel 541 according to brightness of the ambient light. The proximity sensor may switch off the display panel 541 and/or backlight when the mobile phone is moved to the ear. As one type of motion sensor, an acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the mobile phone, are not further described herein.

The audio circuit 560, a loudspeaker 561, and a microphone 562 may provide audio interfaces between the user and the mobile phone. The audio circuit 560 may convert received audio data into an electric signal and transmit the electric signal to the loudspeaker 561. The loudspeaker 561 converts the electric signal into a sound signal for output. On the other hand, the microphone 562 converts a collected sound signal into an electric signal. The audio circuit 560 receives the electric signal and converts the electric signal into audio data, and outputs the audio data to the processor 580 for processing. Then, the processor 580 sends the audio data to, for example, another apparatus by using the RF circuit 510, or outputs the audio data to the memory 520 for further processing.

Wi-Fi is a short distance wireless transmission technology. The mobile phone may help, by using the Wi-Fi module 570, a user receives and transmits an email, browse a web page, access stream media, and the like. This provides wireless broadband Internet access for the user. Although FIG. 10 shows the Wi-Fi module 570, it may be understood that the Wi-Fi module 570 is not a necessary component of the mobile phone, and when required, the Wi-Fi module may be omitted as long as the scope of the essence of the present disclosure is not changed.

The processor 580 is the control center of the mobile phone, and is connected to various parts of the mobile phone by using various interfaces and lines. By running or executing the software program and/or module stored in the memory 520, and invoking data stored in the memory 520, the processor 580 performs various functions and data processing of the mobile phone, thereby performing overall monitoring on the mobile phone. In some embodiments, the processor 580 may include one or more processing units. In some embodiments, the processor 580 may integrate an application processor and a modem processor. The application processor may process an operating system, a user interface, an application program, and the like. The modem processor may process wireless communication. It may be understood that the foregoing modem may either not be integrated into the processor 580.

The mobile phone further includes the power supply 590 (such as a battery) for supplying power to the components. In some embodiments, the power supply may be logically connected to the processor 580 by using a power management system, thereby implementing functions such as charging, discharging and power consumption management by using the power management system.

Although not shown in the figure, the mobile phone may further include a camera, a Bluetooth module, and the like, which are not further described herein.

In this embodiment of this application, the processor 580 included in the terminal device further has the following functions:

obtaining K frames of source image information of a first to-be-synthesized video, each frame of source image information including a source image and a source motion key point, the source image and the source motion key point corresponding to each other, the source image including a transfer object, and K being an integer greater than 1;

obtaining a plurality of frames of target image information of a second to-be-synthesized video, each frame of target image information including a target motion key point, the second to-be-synthesized video corresponding to a motion reference sequence, the motion reference sequence being used for indicating an image order of video synthesis;

obtaining a first output image corresponding to the K frames of source image information and a first target motion key point by using a video synthesis model, the video synthesis model being used for fusing the source image, the source motion key point, and the target motion key point, the first output image including the transfer object, and the first target motion key point being a target motion key point in the plurality of frames of target image information; and generating a synthesized video according to the motion reference sequence and the first output image.

In some embodiments, the processor 580 is specifically configured to perform the following steps:

performing feature extraction on the K frames of source image information and the first target motion key point by using the video synthesis model to obtain a foreground feature set and a background feature set, the foreground feature set including K foreground features, the background feature set including K background features;

obtaining a foreground fusion feature corresponding to the foreground feature set by using the video synthesis model;

obtaining a background fusion feature corresponding to the background feature set by using the video synthesis model;

performing convolution processing on the foreground fusion feature by using the video synthesis model to obtain a foreground image and a foreground mask, the foreground mask being used for extracting an image contour;

performing convolution processing on the background fusion feature by using the video synthesis model to obtain a background image; and processing the foreground image, the foreground mask, and the background image by using the video synthesis model to obtain the first output image.

In some embodiments, the processor 580 is configured to perform the following steps:

determining K frames of foreground attention mask maps according to the foreground feature set, the source motion key point of the each frame of source image information in the K frames of source image information, and the first target motion key point; and determining the foreground fusion feature according to the K frames of foreground attention mask maps and the foreground feature set.

In some embodiments, the processor 580 is configured to perform the following steps:

calculating the foreground fusion feature in the following manner:

$$\tilde{F}_{f_g}^{\,t}=\Sigma_{k=1}^{K}\odot A_{f_g}^{\,tk},$$

$\tilde{F}_{f_g}^{\,t}$ representing the foreground fusion feature, $\tilde{F}_{f_g}^{\,t}$ representing a $k^{th}$ frame of foreground feature in the foreground feature set, $A_{f_g}^{\,t_k}$ representing a $k^{th}$ frame of foreground attention mask map in the K frames of foreground attention mask maps, and $\odot$ representing pixel multiplication.

In some embodiments, the processor 580 is configured to perform the following steps:

determining K frames of background attention mask maps according to the background feature set, the source motion key point of the each frame of source image information in the K frames of source image information, and the first target motion key point; and determining the background fusion feature according to the K frames of background attention mask maps and the background feature set.

In some embodiments, the processor 580 is configured to perform the following steps:

calculating the background fusion feature in the following manner:

$$\tilde{F}_{b_g}^{\,t}=\Sigma_{k=1}^{K}\odot A_{b_g}^{\,tk},$$

$\tilde{F}_{b_g}^{\,t}$ representing the background fusion feature, $F_{b_g}^{\,t_k}$ representing a $k^{th}$ frame of background feature in the background feature set, $A_{b_g}^{\,t_k}$ representing a $k^{th}$ frame of background attention mask map in the K frames of background attention mask maps, and $\odot$ representing pixel multiplication.

In some embodiments, the processor 580 is configured to perform the following steps:

calculating the first output image in the following manner:

$$O^t=O_{f_g}^{\,t}\odot M_{f_g}^{\,t}+O_{b_g}^{\,t}(1-M_{f_g}^{\,t}),$$

$O^t$ representing the first output image corresponding to a $t^{th}$ frame, $O_{f_g}^{\,t}$ representing the foreground image corresponding to the $t^{th}$ frame, $O_{b_g}^{\,t}$ representing the background image corresponding to the $t^{th}$ frame, $M_{f_g}^{\,t}$ representing the foreground mask corresponding to the $t^{th}$ frame, and $\odot$ representing pixel multiplication.

In some embodiments, the processor 580 is further configured to perform the following steps:

obtaining a second output image corresponding to the K frames of source image information and a second target motion key point by using the video synthesis model, the second output image including the transfer object, and the second target motion key point being a target motion key point in the plurality of frames of target image information; and processing the first output image and the second output image according to the motion reference sequence to obtain the synthesized video.

Figure 11:
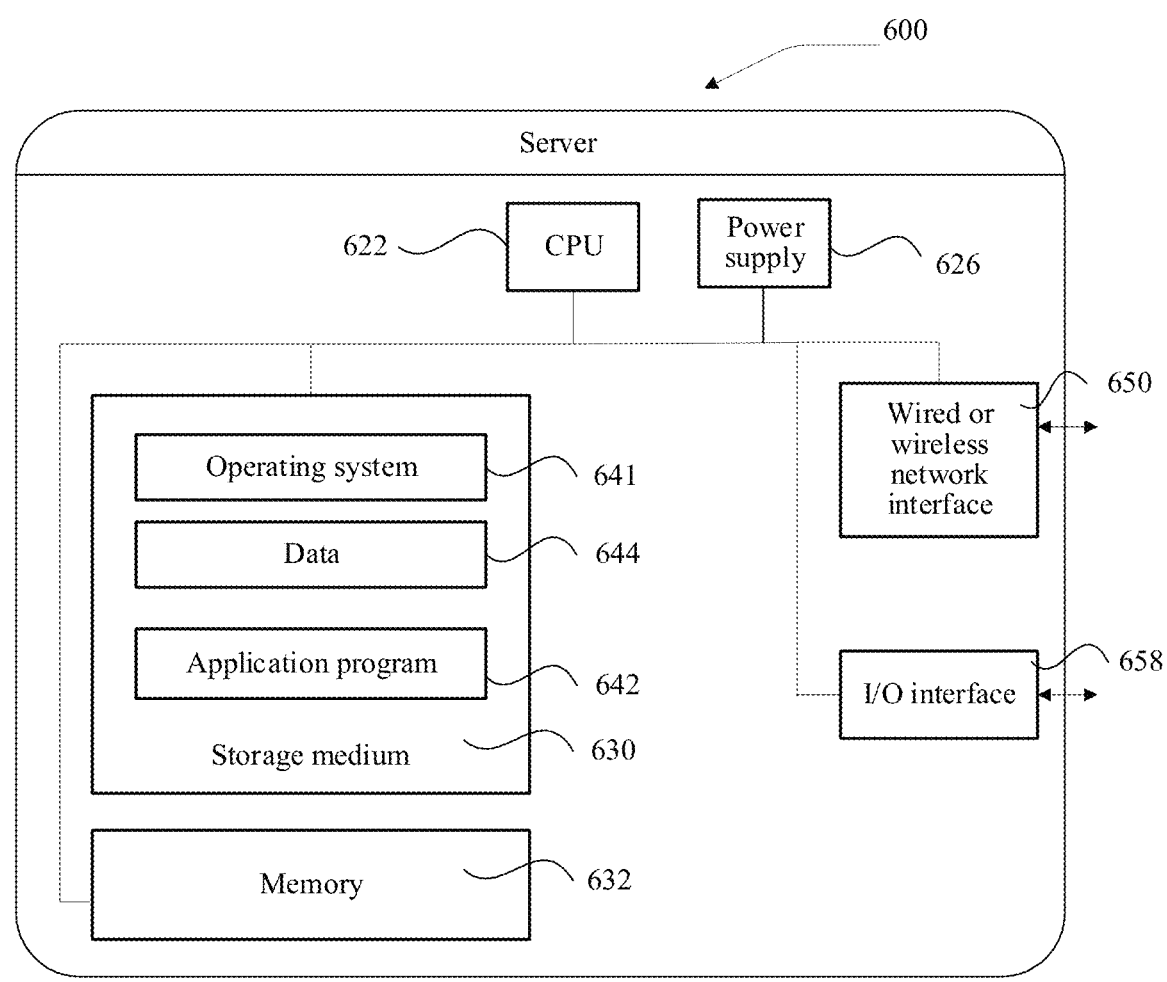
FIG. 11 is a schematic diagram of an embodiment of a server according to an embodiment of this application.

FIG. 11 is a schematic structural diagram of a server according to an embodiment of this application. The server 600 may vary greatly due to different configurations or performance, and may include one or more central processing units (CPUs) 622 (for example, one or more processors) and a memory 632, and one or more storage media 630 (for example, one or more mass storage devices) that store application programs 642 or data 644. The memory 632 and the storage medium 630 may be transient or persistent storages. The program stored in the storage medium 630 may include one or more modules (not shown), and each module may include a series of instruction operations for the server. Further, the central processing unit 622 may be set to communicate with the storage medium 630, and execute, on the server 600, the series of instruction operations stored in the storage medium 630.

The server 600 may further include one or more power supplies 626, one or more wired or wireless network interfaces 650, one or more input/output interfaces 658, and/or one or more operating systems 641 such as Windows Server™, Mac OS X™, Unix™, Linux™ or FreeBSD™.

The steps performed by the server in the foregoing embodiments may be based on the server structure shown in FIG. 11.

In this embodiment of this application, the CPU 622 included in the server further has the following functions:

obtaining a to-be-trained video, the to-be-trained video including a plurality of frames of to-be-trained image information, each frame of to-be-trained image information including a target motion key point;

obtaining a predicted output image corresponding to the to-be-trained video by using a to-be-trained video synthesis model;

processing the predicted output image and a real output image by using a content loss function to obtain a first loss result and a second loss result;

processing the predicted output image and the real output image by using an adversarial loss function to obtain a third loss result and a fourth loss result; and training the to-be-trained video synthesis model according to the first loss result, the second loss result, the third loss result, and the fourth loss result, to obtain a video synthesis model, the video synthesis model being used for fusing a source image, a source motion key point, and a target motion key point, the source image and the source motion key point belonging to a first to-be-synthesized video, and the target motion key point belonging to a second to-be-synthesized video.

In some embodiments, the CPU 622 is configured to perform the following steps:

performing feature extraction on the predicted output image to obtain a predicted image feature, and performing feature extraction on the real output image to obtain a real image feature;

calculating the predicted output image and the real output image by using a mean square error loss function to obtain the first loss result; and calculating the predicted image feature and the real image feature by using a VGG loss function to obtain the second loss result; and calculating the predicted output image, the real output image, and the target motion key point by using a single-frame adversarial loss function and an image reality discriminator to obtain the third loss result; and calculating a predicted output video and a real output video by using a time-domain adversarial loss function and a video reality discriminator to obtain the fourth loss result, the predicted output video including a plurality of frames of predicted output images, and the real output video including a plurality of frames of real output images.

In some embodiments, the CPU 622 is configured to perform the following steps:

calculating the first loss result in the following manner:

$$L_{MSE}=\Sigma_t\|O^t-I_T^{\,t}\|_2^{\,2},$$

$L_{MSE}$ representing the first loss result, $O^t$ representing the predicted output image, $I_T^{\,t}$ representing the real output image, and t representing a frame number of an image;

calculating the second loss result in the following manner:

$$L_{VGG}=\Sigma_t\|\phi(O^t)-\phi(I_T^t)\|_2,$$

$L_{VGG}$ representing the second loss result, $\phi(O^t)$ representing the predicted image feature, and $\phi(I_T^t)$ representing the real image feature;

calculating the third loss result in the following manner:

$$L_{GAN,I}=\Sigma_t\|D_I(I_T^t,p_T^t)\|_2^2+\|1-D_I(O^t,p_T^t)\|_2^2,$$

$L_{GAN,I}$ representing the third loss result, $D_I$ representing the image reality discriminator, and $p_T^t$ representing the target motion key point; and calculating the fourth loss result in the following manner:

$$L_{GAN,V}=\Sigma_n\Sigma_t\|D_V^n(V_T^{[t-n+1,t]},W_T^{[t-n+2,t]})\|_2^2+\|1-D_V^n(V_O^{[t-n+1,t]},W_T^{[t-n+2,t]})\|_2^2,$$

$L_{GAN,V}$ representing the fourth loss result, $D_V^n$ representing the video reality discriminator, $V_T^{[t-n+1,t]}$ representing the predicted output video, $V_O^{[t-n+1,t]}$ representing the real output video, $W_T^{[t-n+2,t]}$ representing optical flow information, and n representing a number of image frames used by the video reality discriminator.

In some embodiments, the CPU 622 is configured to perform the following steps:

calculating a total loss result according to the first loss result, the second loss result, the third loss result, and the fourth loss result;

determining a model parameter according to the total loss result; and training the to-be-trained video synthesis model according to the model parameter to obtain the video synthesis model;

calculating the total loss result in the following manner:

$$L_{total}=L_{MSE}+\lambda_{VGG}L_{VGG}+\lambda_{GI}L_{GAN,I}+\lambda_{GV}L_{GAN,V},$$

$L_{total}$ representing the total loss result, $L_{MSE}$ representing the first loss result, $\lambda_{VGG}$ representing a first weight coefficient, $L_{VGG}$ representing the second loss result, and $\lambda_{GI}$ representing a second weight coefficient, $L_{GAN,I}$ representing the third loss result, $\lambda_{GV}$ representing a third weight coefficient, and $L_{GAN,V}$ representing the fourth loss result; and calculating the model parameter in the following manner:

$$\underset{G}{\mathrm{argmin}}\underset{D_I,D_V}{\max}L_{total}(G,D_I,D_V),$$

$$\underset{G}{\mathrm{argmin}}\underset{D_I,D_V}{\max}(\ )$$

representing a variable value in a case that a function takes a maximum or minimum, G representing the model parameter, $D_I$ representing the image reality discriminator, and $D_V$ representing the video reality discriminator.

The embodiments of this application further provide a computer-readable storage medium, configured to store program code, the program code being used for performing the following video synthesis steps:

obtaining K frames of source image information of a first to-be-synthesized video, each frame of source image information including a source image and a source motion key point, the source image and the source motion key point corresponding to each other, the source image including a transfer object, and K being an integer greater than 1;

obtaining a plurality of frames of target image information of a second to-be-synthesized video, each frame of target image information including a target motion key point, the second to-be-synthesized video corresponding to a motion reference sequence, the motion reference sequence being used for indicating an image order of video synthesis;

obtaining a first output image corresponding to the K frames of source image information and a first target motion key point by using a video synthesis model, the video synthesis model being used for fusing the source image, the source motion key point, and the target motion key point, the first output image including the transfer object, and the first target motion key point being a target motion key point in the plurality of frames of target image information; and generating a synthesized video according to the motion reference sequence and the first output image.

In a possible implementation, the program code may be used for performing the following steps:

performing feature extraction on the K frames of source image information and the first target motion key point by using the video synthesis model to obtain a foreground feature set and a background feature set, the foreground feature set including K foreground features, the background feature set including K background features;

obtaining a foreground fusion feature corresponding to the foreground feature set by using the video synthesis model;

obtaining a background fusion feature corresponding to the background feature set by using the video synthesis model;

performing convolution processing on the foreground fusion feature by using the video synthesis model to obtain a foreground image and a foreground mask, the foreground mask being used for extracting an image contour;

performing convolution processing on the background fusion feature by using the video synthesis model to obtain a background image; and processing the foreground image, the foreground mask, and the background image by using the video synthesis model to obtain the first output image.

In a possible implementation, the program code may be used for performing the following steps:

determining K frames of foreground attention mask maps according to the foreground feature set, the source motion key point of the each frame of source image information in the K frames of source image information, and the first target motion key point; and determining the foreground fusion feature according to the K frames of foreground attention mask maps and the foreground feature set.

In a possible implementation, the program code may be used for performing the following steps:

calculating the foreground fusion feature in the following manner:

$$\tilde{F}_{f_g}^t=\Sigma_{k=1}^K F_{f_g}^{t_k}\odot A_{f_g}^{t_k},$$

$\tilde{F}_{f_g}^t$ representing the foreground fusion feature, $\tilde{F}_{f_g}^t$ representing a $k^{th}$ frame of foreground feature in the foreground feature set, $A_{f_g}^{t_k}$ representing a $k^{th}$ frame of foreground attention mask map in the K frames of foreground attention mask maps, and $\odot$ representing pixel multiplication.

In a possible implementation, the program code may be used for performing the following steps:

determining K frames of background attention mask maps according to the background feature set, the source motion key point of the each frame of source image information in the K frames of source image information, and the first target motion key point; and determining the background fusion feature according to the K frames of background attention mask maps and the background feature set.

In a possible implementation, the program code may be used for performing the following steps:

calculating the background fusion feature in the following manner:

$$\tilde{F}_{b_g}{}^t = \Sigma_{k=1}{}^K F_{b_g}{}^{tk} \odot A_{b_g}{}^{tk},$$

$\tilde{F}_{b_g}{}^t$ representing the background fusion feature, $F_{b_g}{}^{tk}$ representing a $k^{th}$ frame of background feature in the background feature set, $A_{b_g}{}^{tk}$ representing a $k^{th}$ frame of background attention mask map in the K frames of background attention mask maps, and $\odot$ representing pixel multiplication.

In a possible implementation, the program code may be used for performing the following steps:

calculating the first output image in the following manner:

$$O^t = O_{f_g}{}^t \odot M_{f_g}{}^t + O_{b_g}{}^t (1-M_{f_g}{}^t),$$

$O^t$ representing the first output image corresponding to a $t^{th}$ frame, $O_{f_g}{}^t$ representing the foreground image corresponding to the $t^{th}$ frame, $O_{b_g}{}^t$ representing the background image corresponding to the $t^{th}$ frame, $M_{f_g}{}^t$ representing the foreground mask corresponding to the $t^{th}$ frame, and $\odot$ representing pixel multiplication.

In a possible implementation, the program code may be used for performing the following steps:

obtaining a second output image corresponding to the K frames of source image information and a second target motion key point by using the video synthesis model, the second output image including the transfer object, and the second target motion key point being a target motion key point in the plurality of frames of target image information; and processing the first output image and the second output image according to the motion reference sequence to obtain the synthesized video.

In an embodiment of this application, the program code may be further used for performing the following model training steps:

obtaining a to-be-trained video, the to-be-trained video including a plurality of frames of to-be-trained image information, each frame of to-be-trained image information including a target motion key point;

obtaining a predicted output image corresponding to the to-be-trained video by using a to-be-trained video synthesis model;

processing the predicted output image and a real output image by using a content loss function to obtain a first loss result and a second loss result;

processing the predicted output image and the real output image by using an adversarial loss function to obtain a third loss result and a fourth loss result; and training the to-be-trained video synthesis model according to the first loss result, the second loss result, the third loss result, and the fourth loss result, to obtain a video synthesis model, the video synthesis model being used for fusing a source image, a source motion key point, and a target motion key point, the source image and the source motion key point belonging to a first to-be-synthesized video, and the target motion key point belonging to a second to-be-synthesized video.

In a possible implementation, the program code may be used for performing the following steps:

performing feature extraction on the predicted output image to obtain a predicted image feature, and performing feature extraction on the real output image to obtain a real image feature;

calculating the predicted output image and the real output image by using a mean square error loss function to obtain the first loss result; and calculating the predicted image feature and the real image feature by using a VGG loss function to obtain the second loss result; and calculating the predicted output image, the real output image, and the target motion key point by using a single-frame adversarial loss function and an image reality discriminator to obtain the third loss result; and calculating a predicted output video and a real output video by using a time-domain adversarial loss function and a video reality discriminator to obtain the fourth loss result, the predicted output video including a plurality of frames of predicted output images, and the real output video including a plurality of frames of real output images.

In a possible implementation, the program code may be used for performing the following steps:

calculating the first loss result in the following manner:

$$L_{MSE} = \Sigma_t \|O^t - I_T{}^t\|_2{}^2,$$

$L_{MSE}$ representing the first loss result, $O^t$ representing the predicted output image, $I_T{}^t$ representing the real output image, and t representing a frame number of an image;

calculating the second loss result in the following manner:

$$L_{VGG} = \Sigma_t \|\phi(O^t) - \phi(I_T{}^t)\|_2,$$

$L_{VGG}$ representing the second loss result, $\phi(O^t)$ representing the predicted image feature, and $\phi(I_T{}^t)$ representing the real image feature;

calculating the third loss result in the following manner:

$$L_{GAN,I} = \Sigma_t \|(D_I(I_T{}^t, p_T{}^t)\|_2{}^2 + \|1 - D_I(O^t, p_T{}^t)\|_2{}^2,$$

$L_{GAN,I}$ representing the third loss result, $D_I$ representing the image reality discriminator, and $p_T{}^t$ representing the target motion key point; and calculating the fourth loss result in the following manner:

$$L_{GAN,V} = \Sigma_n \Sigma_t \|D_V{}^n (V_T{}^{[t-n+1,t]}, W_T{}^{[t-n+2,t]})\|_2{}^2 + \|1 - D_V{}^n (V_O{}^{[t-n+1,t]}, W_T{}^{[t-n+2,t]})\|_2{}^2,$$

$L_{GAN,V}$ representing the fourth loss result, $D_V{}^n$ representing the video reality discriminator, $V_T{}^{[t-n+1,t]}$ representing the predicted output video, $V_O{}^{[t-n+1,t]}$ representing the real output video, $W_T{}^{[t-n+2,t]}$ representing optical flow information, and n representing a number of image frames used by the video reality discriminator.

In a possible implementation, the program code may be used for performing the following steps:

calculating a total loss result according to the first loss result, the second loss result, the third loss result, and the fourth loss result;

determining a model parameter according to the total loss result;

training the to-be-trained video synthesis model according to the model parameter to obtain the video synthesis model;

calculating the total loss result in the following manner:

$$L_{total} = L_{MSE} + \lambda_{VGG} L_{VGG} + \lambda_{GI} L_{GAN,I} + \lambda_{GV} L_{GAN,V},$$

$L_{total}$ representing the total loss result, $L_{MSE}$ representing the first loss result, $\lambda_{VGG}$ representing a first weight coefficient, $L_{VGG}$ representing the second loss result, and $\lambda_{GI}$ representing a second weight coefficient, $L_{GAN,I}$ representing the third loss result, $\lambda_{GV}$ representing a third weight coefficient, and $L_{GAN,V}$ representing the fourth loss result; and calculating the model parameter in the following manner:

$$\underset{G}{\mathrm{argmin}} \underset{D_I, D_V}{\max} L_{total}(G, D_I, D_V),$$

$$\underset{G}{\mathrm{argmin}} \underset{D_I, D_V}{\max} (\ )$$

representing a variable value in a case that a function takes a maximum or minimum, G representing the model parameter, $D_I$ representing the image reality discriminator, and $D_V$ representing the video reality discriminator.

A person skilled in the art can clearly understand that for convenience and conciseness of description, for specific working processes of the foregoing systems, devices and units, reference may be made to the corresponding processes in the foregoing method embodiments, and details are not described herein again.

In the several embodiments provided in this application, it is to be understood that the disclosed system, apparatus, and method may be implemented in other manners. For example, the described apparatus embodiment is merely an example. For example, the unit division is merely a logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separated, and the components displayed as units may or may not be physical units, and may be located in one place or may be distributed over a plurality of network units. Some or all of the units may be selected according to actual needs to achieve the objectives of the solutions of the embodiments.

In addition, functional units in the embodiments of this application may be integrated into one processing unit, or each of the units may be physically separated, or two or more units may be integrated into one unit. The integrated unit may be implemented in the form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the related art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, a person of ordinary skill in the art is to understand that they may still make modifications to the technical solutions described in the foregoing embodiments or make equivalent replacements to some technical features thereof, without departing from the spirit and scope of the technical solutions of the embodiments of this application.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the pre-defined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs video synthesis and/or model training. In practical application, the foregoing functions may be allocated to and completed by different functional modules according to requirements, that is, an inner structure of a device is divided into different functional modules to implement all or a part of the functions described above.

What is claimed is:

1. A video synthesis method, comprising:
obtaining a plurality of frames corresponding to source image information of a first to-be-synthesized video, each frame of the source image information comprising a source image that includes a transfer object and a source motion key point having a one-to-one correspondence with the source image;
obtaining a plurality of frames corresponding to target image information of a second to-be-synthesized video, the second to-be-synthesized video having a motion reference sequence for indicating an image order of video synthesis, each frame of the target image information comprising a target motion key point;
for each frame of the plurality of frames corresponding to the target image information of the second to-be-synthesized video:
fusing a respective source image from the first to-be-synthesized video, the corresponding source motion key point, and a respective target motion key point corresponding to the frame using a pre-trained video synthesis model; and
generating a respective output image in accordance with the fusing, the respective output image comprising the transfer object modified by the respective target motion key point and corresponding to a respective frame of the plurality of frames of the source image information and the respective target motion key point; and repeating the fusing and the generating steps for the second to-be-synthesized video to produce a synthesized video according to the motion reference sequence.

2. The method according to claim 1, wherein generating the respective output image comprises:
performing feature extraction on the plurality of frames corresponding to the source image information and the first target motion key point using the video synthesis model to obtain a foreground feature set and a background feature set, the foreground feature set comprising a plurality of foreground features, the background feature set comprising a plurality of background features;
obtaining a foreground fusion feature corresponding to the foreground feature set using the video synthesis model;
obtaining a background fusion feature corresponding to the background feature set using the video synthesis model;
performing convolution processing on the foreground fusion feature using the video synthesis model to obtain a foreground image and a foreground mask, the foreground mask being used for extracting an image contour;
performing convolution processing on the background fusion feature using the video synthesis model to obtain a background image; and
processing the foreground image, the foreground mask, and the background image using the video synthesis model to generate the respective output image.

3. The method according to claim 2, wherein obtaining the foreground fusion feature further comprises:
determining a plurality of frames corresponding to foreground attention mask maps according to the foreground feature set, the source motion key point of each frame of the source image information in the plurality frames corresponding to the source image information, and the respective target motion key point; and
determining the foreground fusion feature according to the plurality of frames of foreground attention mask maps and the foreground feature set.

4. The method according to claim 3, wherein determining the foreground fusion feature further comprises:
calculating the foreground fusion feature according to:

$$\tilde{F}_{f_g}^t = \Sigma_{k=1}^K F_{f_g}^{tk} \odot A_{f_g}^{tk},$$

wherein $\tilde{F}_{f_g}^t$ represents the foreground fusion feature, $\tilde{F}_{f_g}^t$ represents a $k^{th}$ frame of foreground feature in the foreground feature set, $A_{f_g}^{tk}$ represents a $k^{th}$ frame of foreground attention mask map in the plurality of frames of foreground attention mask maps, and $\odot$ represents pixel multiplication.

5. The method according to claim 2, wherein obtaining the background fusion feature further comprises:
determining a plurality of frames of background attention mask maps according to the background feature set, the source motion key point of each frame of the source image information in the plurality of frames corresponding to source image information, and the first target motion key point; and
determining the background fusion feature according to the plurality of frames corresponding to the background attention mask maps and the background feature set.

6. The method according to claim 5, wherein determining the background fusion feature according to the plurality of frames corresponding to the background attention mask maps and the background feature set comprises:
calculating the background fusion feature according to:

$$\tilde{F}_{b_g}^t = \Sigma_{k=1}^K F_{b_g}^{tk} \odot A_{b_g}^{tk},$$

wherein $\tilde{F}_{b_g}^t$ represents the background fusion feature, $F_{b_g}^{tk}$ represents a $k^{th}$ frame of background feature in the background feature set, $A_{b_g}^{tk}$ represents a $k^{th}$ frame of background attention mask map in the K frames of background attention mask maps, and $\odot$ represents pixel multiplication.

7. The method according to claim 2, wherein processing the foreground image, the foreground mask, and the background image using the video synthesis model further comprises:
calculating the first output image according to:

$$O^t = O_{f_g}^t \odot M_{f_g}^t + O_{b_g}^t (1 - M_{f_g}^t),$$

$O^t$ represents the first output image corresponding to a $t^{th}$ frame, $O_{f_g}^t$ represents the foreground image corresponding to the $t^{th}$ frame, $O_{b_g}^t$ represents the background image corresponding to the $t^{th}$ frame, $M_{f_g}^t$ represents the foreground mask corresponding to the $t^{th}$ frame, and $\odot$ represents pixel multiplication.

8. The method according to claim 1, further comprising prior to producing the synthesized video:
generating a second output image corresponding to the plurality of frames corresponding to the source image information and a second target motion key point using the video synthesis model, the second output image comprising the transfer object, and the second target motion key point being a target motion key point in the plurality of frames corresponding to the target image information; and
producing the synthesized video further comprises:
processing the first output image and the second output image according to the motion reference sequence to obtain the synthesized video.

9. A computing device, comprising:
one or more processors; and
memory, the memory storing one or more programs comprising instructions that, when executed by the one or more processors, cause the one or more processors to perform operations comprising:
obtaining a plurality of frames corresponding to source image information of a first to-be-synthesized video, each frame of the source image information comprising a source image that includes a transfer object and a source motion key point having a one-to-one correspondence with the source image;
obtaining a plurality of frames corresponding to target image information of a second to-be-synthesized video, the second to-be-synthesized video having a motion reference sequence for indicating an image order of video synthesis, each frame of the target image information comprising a target motion key point;
for each frame of the plurality of frames corresponding to the target image information of the second to-be-synthesized video:
fusing a respective source image from the first to-be-synthesized video, the corresponding source motion key point, and a respective target motion key point corresponding to the frame using a pre-trained video synthesis model; and
generating a respective output image in accordance with the fusing, the respective output image comprising the transfer object modified by the respective target motion key point and corresponding to a respective frame of the plurality of frames of the source image information and the respective target motion key point; and repeating the fusing and the generating steps for the second to-be-synthesized video to produce a synthesized video according to the motion reference sequence.

10. The computing device according to claim 9, wherein generating the respective output image comprises:
performing feature extraction on the plurality of frames corresponding to the source image information and the first target motion key point using the video synthesis model to obtain a foreground feature set and a background feature set, the foreground feature set comprising a plurality of foreground features, the background feature set comprising a plurality of background features;
obtaining a foreground fusion feature corresponding to the foreground feature set using the video synthesis model;
obtaining a background fusion feature corresponding to the background feature set using the video synthesis model;
performing convolution processing on the foreground fusion feature using the video synthesis model to obtain a foreground image and a foreground mask, the foreground mask being used for extracting an image contour;
performing convolution processing on the background fusion feature using the video synthesis model to obtain a background image; and
processing the foreground image, the foreground mask, and the background image using the video synthesis model to generate the respective output image.

11. The computing device according to claim 10, wherein obtaining the foreground fusion feature further comprises:
determining a plurality of frames corresponding to foreground attention mask maps according to the foreground feature set, the source motion key point of each frame of the source image information in the plurality frames corresponding to the source image information, and the respective target motion key point; and
determining the foreground fusion feature according to the plurality of frames of foreground attention mask maps and the foreground feature set.

12. The computing device according to claim 11, wherein determining the foreground fusion feature further comprises:
calculating the foreground fusion feature according to:

$$\tilde{F}_{f_g}^{t}=\Sigma_{k=1}^{K}F_{f_g}^{t_k}\odot A_{f_g}^{t_k},$$

wherein $\tilde{F}_{f_g}^{t}$ represents the foreground fusion feature, $F_{f_g}^{t_k}$ represents a $k^{th}$ frame of foreground feature in the foreground feature set, $A_{f_g}^{t_k}$ represents a $k^{th}$ frame of foreground attention mask map in the plurality of frames of foreground attention mask maps, and $\odot$ represents pixel multiplication.

13. The computing device according to claim 10, wherein obtaining the background fusion feature further comprises:
determining a plurality of frames of background attention mask maps according to the background feature set, the source motion key point of each frame of the source image information in the plurality of frames corresponding to source image information, and the first target motion key point; and
determining the background fusion feature according to the plurality of frames corresponding to the background attention mask maps and the background feature set.

14. The computing device according to claim 13, wherein determining the background fusion feature according to the plurality of frames corresponding to the background attention mask maps and the background feature set comprises:
calculating the background fusion feature according to:

$$\tilde{F}_{b_g}^{t}=\Sigma_{k=1}^{K}F_{b_g}^{t_k}\odot A_{b_g}^{t_k},$$

wherein $\tilde{F}_{b_g}^{t}$ represents the background fusion feature, $F_{b_g}^{t_k}$ represents a $k^{th}$ frame of background feature in the background feature set, $A_{b_g}^{t_k}$ represents a $k^{th}$ frame of background attention mask map in the K frames of background attention mask maps, and $\odot$ represents pixel multiplication.

15. A non-transitory computer-readable storage medium storing instructions that, when executed by one or more processors of a computing device, cause the one or more processors to perform operations comprising:
obtaining a plurality of frames corresponding to source image information of a first to-be-synthesized video, each frame of the source image information comprising a source image that includes a transfer object and a source motion key point having a one-to-one correspondence with the source image;
obtaining a plurality of frames corresponding to target image information of a second to-be-synthesized video, the second to-be-synthesized video having a motion reference sequence for indicating an image order of video synthesis, each frame of the target image information comprising a target motion key point;
for each frame of the plurality of frames corresponding to the target image information of the second to-be-synthesized video:
fusing a respective source image from the first to-be-synthesized video, the corresponding source motion key point, and a respective target motion key point corresponding to the frame using a pre-trained video synthesis model; and
generating a respective output image in accordance with the fusing, the respective output image comprising the transfer object modified by the respective target motion key point and corresponding to a respective frame of the plurality of frames of the source image information and the respective target motion key point; and
repeating the fusing and the generating steps for the second to-be-synthesized video to produce a synthesized video according to the motion reference sequence.

16. The non-transitory computer-readable storage medium according to claim 15, wherein generating the respective output image comprises:
performing feature extraction on the plurality of frames corresponding to the source image information and the first target motion key point using the video synthesis model to obtain a foreground feature set and a background feature set, the foreground feature set comprising a plurality of foreground features, the background feature set comprising a plurality of background features;
obtaining a foreground fusion feature corresponding to the foreground feature set using the video synthesis model;

obtaining a background fusion feature corresponding to the background feature set using the video synthesis model;

performing convolution processing on the foreground fusion feature using the video synthesis model to obtain a foreground image and a foreground mask, the foreground mask being used for extracting an image contour;

performing convolution processing on the background fusion feature using the video synthesis model to obtain a background image; and processing the foreground image, the foreground mask, and the background image using the video synthesis model to generate the respective output image.

17. The non-transitory computer-readable storage medium according to claim 16, wherein obtaining the foreground fusion feature further comprises:

determining a plurality of frames corresponding to foreground attention mask maps according to the foreground feature set, the source motion key point of each frame of the source image information in the plurality frames corresponding to the source image information, and the respective target motion key point; and determining the foreground fusion feature according to the plurality of frames of foreground attention mask maps and the foreground feature set.

18. The non-transitory computer-readable storage medium according to claim 17, wherein determining the foreground fusion feature further comprises:

calculating the foreground fusion feature according to:

$$\tilde{F}_{f_g}{}^t = \Sigma_{k=1}^{K} F_{f_g}{}^{t_k} \odot A_{f_g}{}^{t_k},$$

wherein $\tilde{F}_{f_g}{}^t$ represents the foreground fusion feature, $\tilde{F}_{f_g}{}^t$ represents a $k^{th}$ frame of foreground feature in the foreground feature set, $A_{f_g}{}^{t_k}$ represents a $k^{th}$ frame of foreground attention mask map in the plurality of frames of foreground attention mask maps, and $\odot$ represents pixel multiplication.

19. The non-transitory computer-readable storage medium according to claim 16, wherein obtaining the background fusion feature further comprises:

determining a plurality of frames of background attention mask maps according to the background feature set, the source motion key point of each frame of the source image information in the plurality of frames corresponding to source image information, and the first target motion key point; and determining the background fusion feature according to the plurality of frames corresponding to the background attention mask maps and the background feature set.

20. The non-transitory computer-readable storage medium according to claim 19, wherein determining the background fusion feature according to the plurality of frames corresponding to the background attention mask maps and the background feature set comprises:

calculating the background fusion feature according to:

$$\tilde{F}_{b_g}{}^t = \Sigma_{k=1}^{K} F_{b_g}{}^{t_k} \odot A_{b_g}{}^{t_k},$$

wherein $\tilde{F}_{b_g}{}^t$ represents the background fusion feature, $F_{b_g}{}^{t_k}$ represents a $k^{th}$ frame of background feature in the background feature set, $A_{b_g}{}^{t_k}$ represents a $k^{th}$ frame of background attention mask map in the K frames of background attention mask maps, and $\odot$ represents pixel multiplication.

* * * * *